US012730367B2

(12) United States Patent
Tsuji et al.

(10) Patent No.: US 12,730,367 B2
(45) Date of Patent: Sep. 8, 2026

(54) PHOSPHOR WHEEL UNIT AND PROJECTION DISPLAY APPARATUS

(71) Applicant: Panasonic Intellectual Property Management Co., Ltd., Osaka (JP)

(72) Inventors: Kiyoko Tsuji, Osaka (JP); Masato Tanaka, Kyoto (JP); Hiroyuki Masuda, Osaka (JP)

(73) Assignee: PANASONIC PROJECTOR & DISPLAY CORPORATION, Osaka (JP)

( * ) Notice: Subject to any disclaimer, the term of this patent is extended or adjusted under 35 U.S.C. 154(b) by 878 days.

(21) Appl. No.: 17/965,174

(22) Filed: Oct. 13, 2022

(65) Prior Publication Data

US 2023/0110462 A1 Apr. 13, 2023

(30) Foreign Application Priority Data

Oct. 13, 2021 (JP) ................................ 2021-168134

(51) Int. Cl.
*G03B 21/20* (2006.01)
*G03B 21/16* (2006.01)

(52) U.S. Cl.
CPC ........... *G03B 21/204* (2013.01); *G03B 21/16* (2013.01)

(58) Field of Classification Search
CPC .................. G03B 21/16; G03B 21/204; G03B 21/00–64; H04N 9/3144; H04N 9/31–3197; G02B 26/008
See application file for complete search history.

(56) References Cited

U.S. PATENT DOCUMENTS

| | | | | |
|---|---|---|---|---|
| 2003/0095349 | A1* | 5/2003 | Inamoto ............... | H04N 9/3141 348/E5.143 |
| 2017/0192346 | A1 | 7/2017 | Chikayama et al. | |
| 2018/0066835 | A1* | 3/2018 | Kobayashi ........... | H04N 9/3158 |
| 2018/0088317 | A1* | 3/2018 | Yoshikawa .............. | G02B 5/20 |
| 2019/0072264 | A1 | 3/2019 | Nagatani et al. | |

(Continued)

FOREIGN PATENT DOCUMENTS

| | | |
|---|---|---|
| CN | 207352347 | 5/2018 |
| JP | 2010-96878 | 4/2010 |
| JP | 2016-118604 | 6/2016 |

(Continued)

*Primary Examiner* — Christopher A Lamb, II
(74) *Attorney, Agent, or Firm* — Wenderoth, Lind & Ponack, L.L.P.

(57) ABSTRACT

A phosphor wheel unit includes a phosphor wheel that converts incident light into fluorescent light and emits the fluorescent light, a first heat exchanger having a plurality of fin members that is arranged and an airflow inlet surface through which an airflow generated by rotation of the phosphor wheel partially or entirely flows in, and a regulating member that regulates a direction of the airflow. The direction of the airflow regulated by the regulating member and a direction perpendicular to a rotation shaft of the phosphor wheel form an angle of between 0 degrees and 45 degrees on a surface perpendicular to an extending direction of a base material of the phosphor wheel. The airflow inlet surface is disposed intercepting the direction of the airflow regulated by the regulating member. The first heat exchanger cools a gas forming the airflow and the cooled gas returns to the phosphor wheel.

21 Claims, 18 Drawing Sheets

(56) References Cited

U.S. PATENT DOCUMENTS

| | | | | |
|---|---|---|---|---|
| 2020/0271301 | A1 | 8/2020 | Hu et al. | |
| 2021/0282247 | A1 * | 9/2021 | Ogawa | H04N 9/3164 |

FOREIGN PATENT DOCUMENTS

| | | |
|---|---|---|
| JP | 2017-76074 | 4/2017 |
| JP | 2017-215563 | 12/2017 |
| JP | 2019-504441 | 2/2019 |
| JP | 6773786 | 10/2020 |
| WO | 2016/170969 | 10/2016 |

* cited by examiner

FIG. 10

PHOSPHOR WHEEL UNIT AND PROJECTION DISPLAY APPARATUS

BACKGROUND

1. Technical Field

The present disclosure relates to a phosphor wheel unit, and more specifically to a phosphor wheel unit having a cooling structure for cooling a phosphor wheel, and a projection display apparatus including the phosphor wheel unit.

2. Description of the Related Art

A projection display apparatus illuminates the phosphor wheel to be capable of converting emitted light into light having a color different from the color of the emitted light. However, nearly half of energy of the illuminated light is not converted and becomes heat. Thus, the phosphor wheel becomes high in temperature and has to be cooled.

For example, in Patent Literature (PTL) 1, air that is circulated in a housing and heated by a fluorescent color wheel (phosphor wheel) is cooled by letting the air pass through a heat exchanger.

PTL 1 is Japanese Patent No. 6773786.

SUMMARY

In recent years, the amount of light illuminating a phosphor wheel unit tends to increase, and cooling efficiency of the phosphor wheel unit has to be improved.

The present disclosure aims to provide a phosphor wheel unit in which cooling efficiency is improved and a projection display apparatus.

A phosphor wheel unit of the present disclosure includes a phosphor wheel that converts incident light into fluorescent light and emits the fluorescent light, a motor that rotationally drives the phosphor wheel, a first heat exchanger having a plurality of fin members that is arranged and an airflow inlet surface through which an airflow generated by rotation of the phosphor wheel partially or entirely flows in, and a regulating member that regulates a direction of the airflow generated by the rotation of the phosphor wheel. The direction of the airflow regulated by the regulating member and a direction perpendicular to a rotation shaft of the phosphor wheel form an angle of between 0 degrees and 45 degrees on a surface perpendicular to an extending direction of a base material of the phosphor wheel. The airflow inlet surface is disposed intercepting the direction of the airflow regulated by the regulating member. The first heat exchanger cools a gas forming the airflow and the cooled gas returns to the phosphor wheel.

The projection display apparatus of the present disclosure includes the above-described phosphor wheel unit.

The phosphor wheel unit of the present disclosure in which cooling efficiency is improved and the projection display apparatus can be provided.

BRIEF DESCRIPTION OF THE DRAWINGS

FIG. 10 is a schematic diagram illustrating an overall configuration of a projection display apparatus according to a third exemplary embodiment;

DETAILED DESCRIPTIONS

Exemplary embodiments will be described in detail below with reference to the drawings as appropriate. However, unnecessarily detailed description may be omitted. For example, the detailed description of already well-known matters and the overlap description of substantially the same configurations may be omitted. This is to avoid an unnecessarily redundant description below and to facilitate understanding by those skilled in the art.

Here, the inventors of the present disclosure provide the accompanying drawings and the following description such that those skilled in the art can sufficiently understand the present disclosure, and therefore, they do not intend to restrict the subject matters of claims by the accompanying drawings and the following description.

FIRST EXEMPLARY EMBODIMENT

Figure 1:
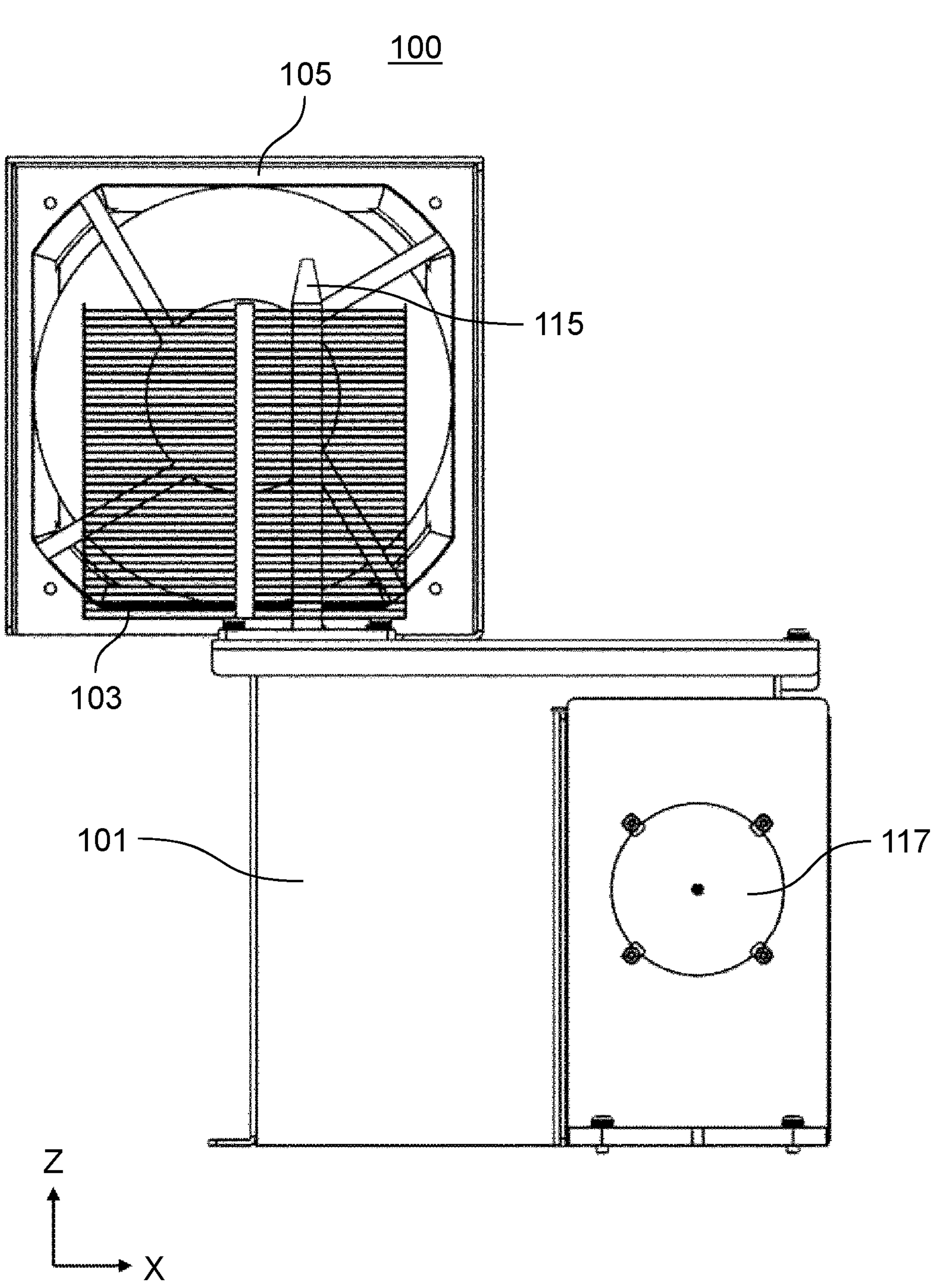
FIG. 1 is an entire front view of a phosphor wheel unit according to a first exemplary embodiment.
Figure 2:
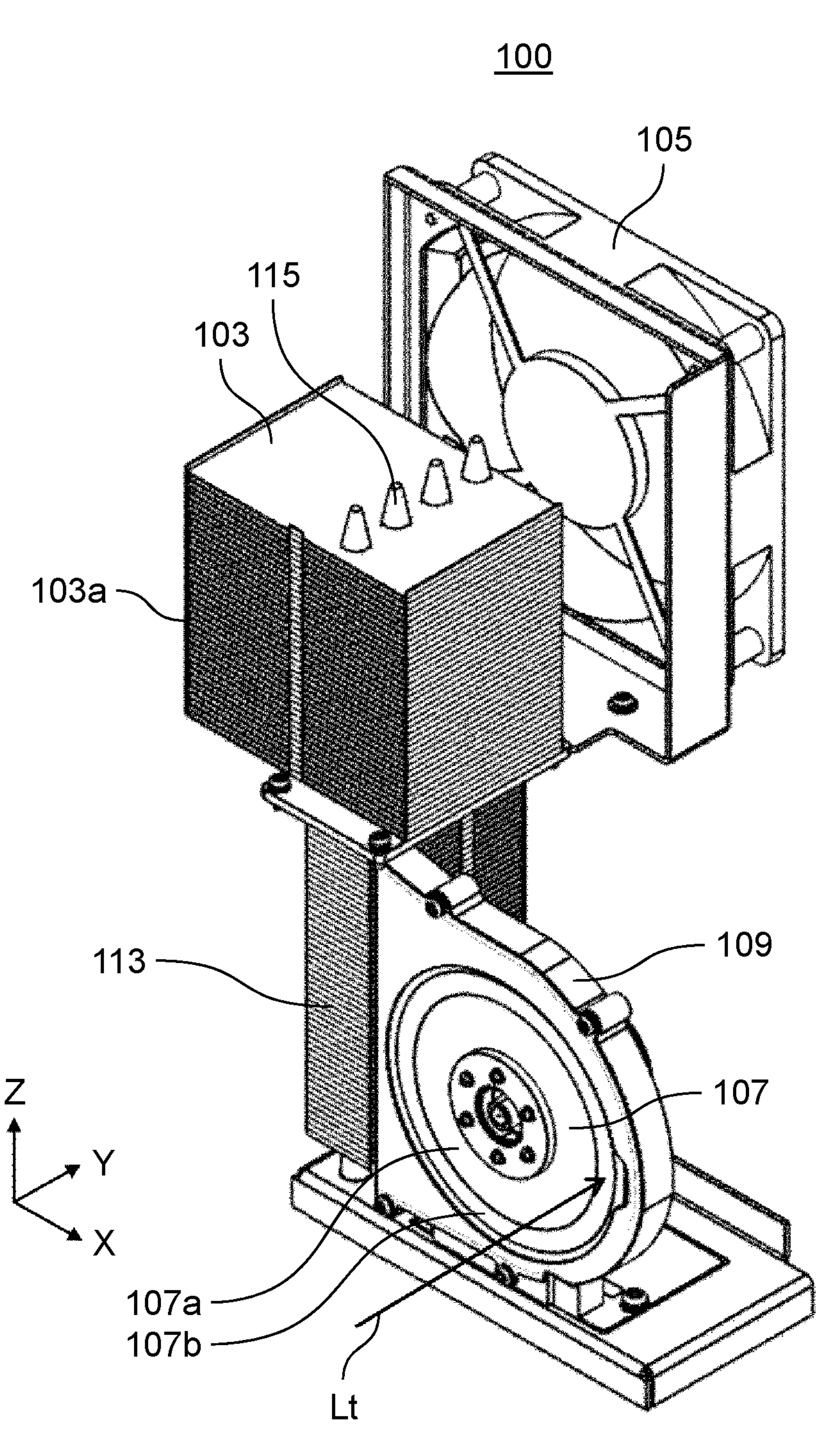
FIG. 2 is a perspective view of the phosphor wheel unit from which a housing is removed.
Figure 3:
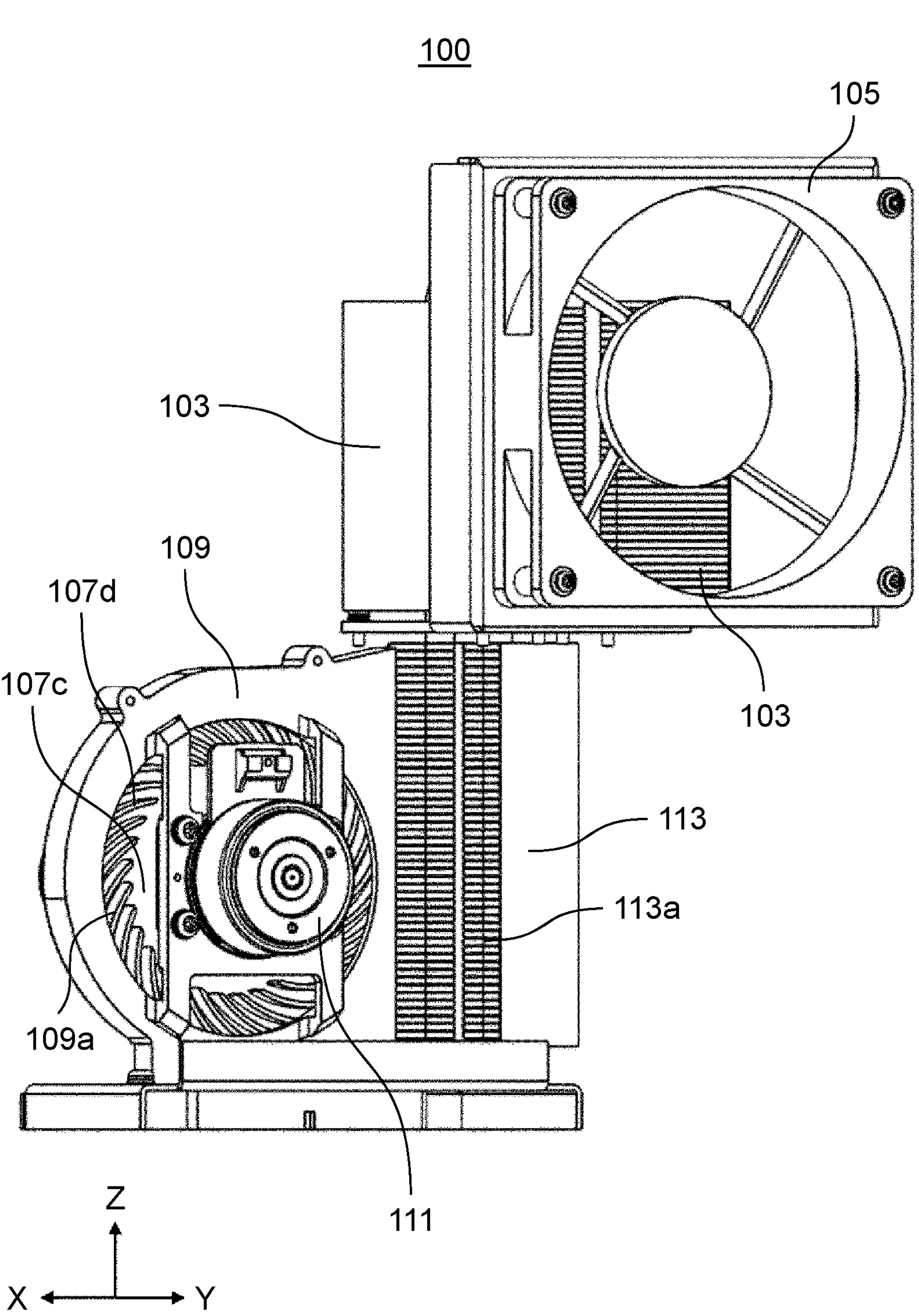
FIG. 3 is a perspective view of the phosphor wheel unit from which the housing is removed.
Figure 4:
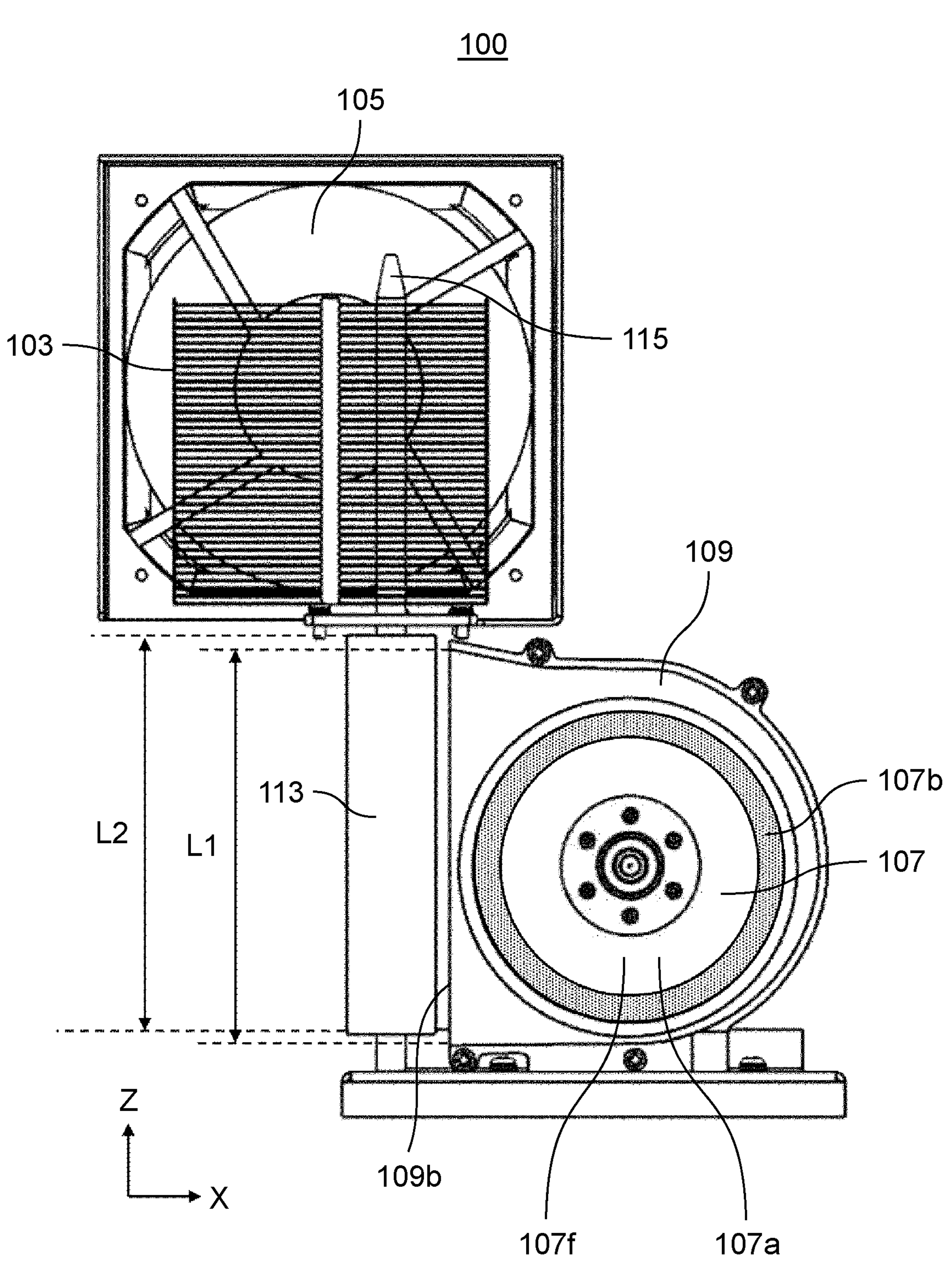
FIG. 4 is a front view of the phosphor wheel unit from which the housing is removed.

Hereinafter, a first exemplary embodiment will be described with reference to FIGS. 1 to 4. FIG. 1 is an entire front view of phosphor wheel unit 100 according to the first exemplary embodiment of the present disclosure. FIGS. 2 and 3 are perspective views of phosphor wheel unit 100 from which housing 101 is removed. FIG. 4 is a front view of phosphor wheel unit 100 from which housing 101 is removed. In each drawing, a direction in which excitation light Lt enters is a +Y-direction, a plane on which phosphor wheel 107 receives excitation light Lt is an XZ-plane formed by an X-direction and a Z-direction. The Z-direction is orthogonal to the X-direction. The XZ-plane is orthogonal to the Y-direction.

[1-1. Configuration]

As illustrated in FIGS. 1 and 2, phosphor wheel unit 100 includes housing 101, second heat exchanger 103 disposed outside housing 101 and having a plurality of fins 103*a* (an example of fin members), and fan 105. Housing 101 is made of metal, for example.

As illustrated in FIGS. 2 to 4, phosphor wheel unit 100 includes phosphor wheel 107, wheel case 109, motor 111, first heat exchanger 113, and heat conductive member 115 in housing 101.

Phosphor wheel 107 converts incident excitation light Lt into fluorescent light, and emits the converted fluorescent light. In phosphor wheel 107, phosphor layer 107*b* is disposed on incident surface 107*a* where excitation light Lt enters. From phosphor layer 107*b*, for example, fluorescent light of yellow including green and red is emitted due to incident excitation light Lt of blue.

Wheel case 109 houses phosphor wheel 107, and regulates a direction of an airflow (gas flow) generated by rotation of phosphor wheel 107. Wheel case 109 is made of metal, for example. Motor 111 rotationally drives phosphor wheel 107 about rotation shaft Ar (see FIG. 5).

First heat exchanger 113 allows the airflow flowing out of phosphor wheel 107 to pass therethrough, heat of a gas is transferred at this time, and the gas is cooled. First heat exchanger 113 includes a plurality of rectangular fins 113*a* (an example of fin members) arranged in parallel in the Z-direction. When the gas passes between fins 113*a*, the heat of the gas is transferred to fins 113*a*. Fins 113*a* are made of metal with high thermal conductivity, for example, copper or aluminum. Housing 101 is an enclosed space, and the gas cooled by first heat exchanger 113 returns to phosphor wheel 107. In this manner, an airflow that circulates from phosphor wheel 107 through first heat exchanger 113 to phosphor wheel 107 is generated in housing 101.

Heat conductive member 115 conducts heat of first heat exchanger 113 to second heat exchanger 103. Heat conductive member 115 is, for example, a heat pipe, and connects first heat exchanger 113 disposed in housing 101 and second heat exchanger 103 disposed outside housing 101. Heat conductive member 115 is an example of a heat transfer material.

Fan 105 sends cooling air to second heat exchanger 103 to dissipate heat of second heat exchanger 103 into the cooling air, thereby improving cooling capacity of second heat exchanger 103. In this manner, the heat inside housing 101 is efficiently transferred to the outside of housing 101.

Phosphor wheel unit 100 further includes convex lens 117 that concentrates incident excitation light Lt onto phosphor wheel 107.

<Phosphor Wheel>

Figure 5:
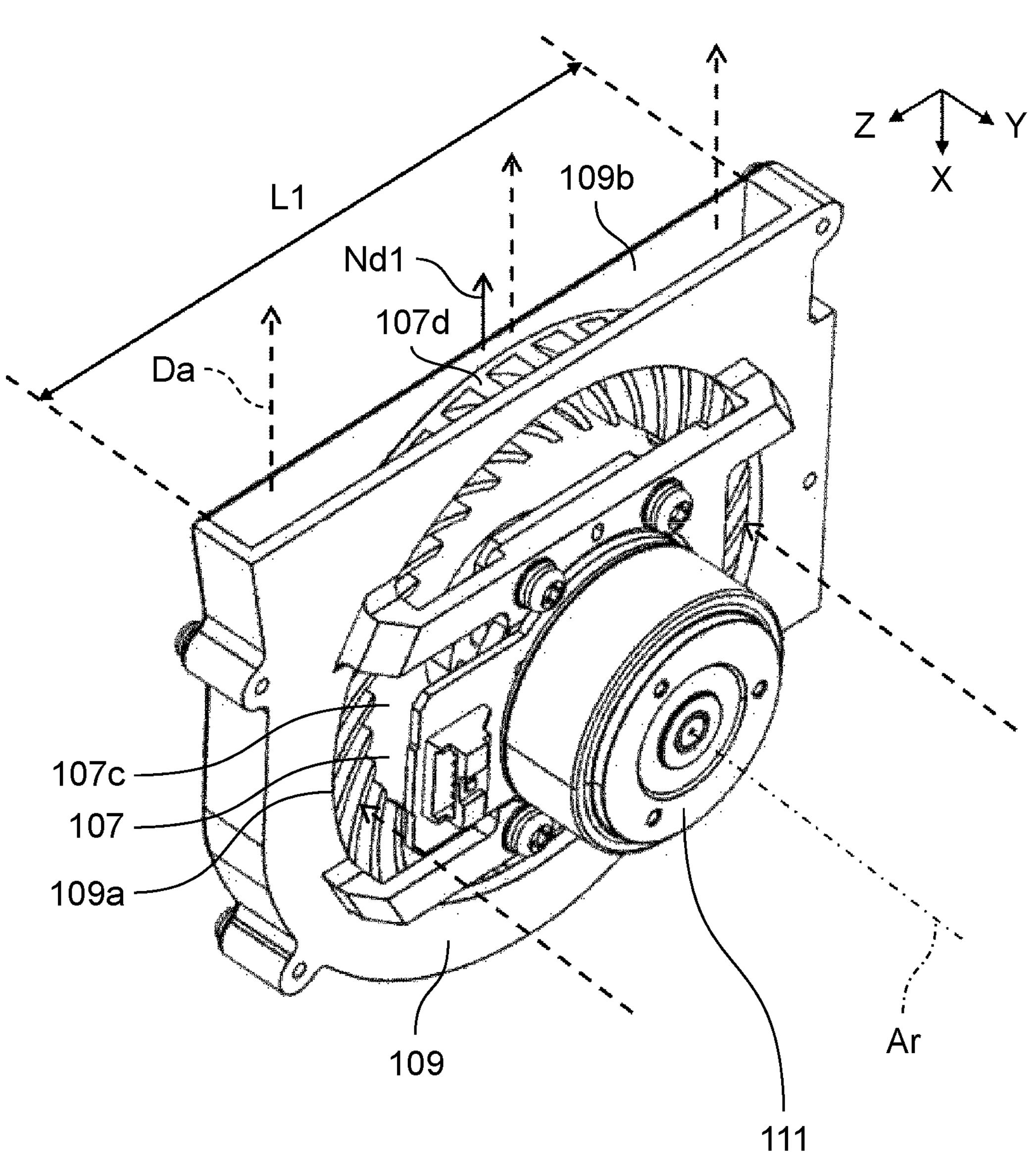
FIG. 5 is a perspective view of a phosphor wheel housed in a wheel case.

Phosphor wheel 107 and wheel case 109 will be described below with reference to FIGS. 4 and 5. FIG. 5 is a perspective view of phosphor wheel 107 housed in wheel case 109.

Phosphor wheel 107 includes base material 107*f* made of metal. Base material 107*f* is disk-shaped and has incident surface 107*a* on a light incident side, and back surface 107*c* on the opposite side to incident surface 107*a*. Annular phosphor layer 107*b* is disposed on incident surface 107*a*.

Phosphor wheel 107 further includes a plurality of fins 107*d* disposed on back surface 107*c*. Fins 107*d* protrude from back surface 107*c*, and, for example, is curved-shaped from the edge of phosphor wheel 107 towards the center. Fins 107*d* increase a volume of the airflow generated when phosphor wheel 107 rotates, thus improves the cooling efficiency of phosphor wheel 107.

Wheel case 109 includes air suction port 109*a* into which a gas flows toward back surface 107*c*, and exhaust port 109*b* that exhausts the gas in a direction perpendicular to the direction of rotation shaft Ar of phosphor wheel 107 after cooling down phosphor wheel 107. Wheel case 109 is a shape to surround an outer periphery of disk-shaped phosphor wheel 107, and to have rectangular exhaust port 109*b* on a part of the outer periphery. Therefore, the direction of the airflow generated by the rotation of phosphor wheel 107 is regulated by wheel case 109. On a plane (in this case, XY-plane) perpendicular to an extending direction of base material 107*f* of phosphor wheel 107, direction Da of the regulated airflow is perpendicular to the direction of rotation shaft Ar. The extending direction is a radial direction of the disk-shaped phosphor wheel 107*f*, or on ZX-plane. Here, direction Da of the regulated airflow is a main direction of the regulated airflow, and "perpendicular" includes a case where direction Da is completely perpendicular and a state where direction Da is inclined by about ±several degrees from the state of being completely perpendicular.

When phosphor wheel 107 radiates heat to the gas flowing in from air suction port 109*a*, the gas is heated up and then discharged from exhaust port 109*b*. An opening surface of exhaust port 109*b* has, for example, a rectangular shape. A length L1 of exhaust port 109*b* in a longitudinal direction (Z-direction) is almost same as a length L2 of first heat exchanger 113 in the direction where fins 113*a* are arranged in parallel (see FIG. 4). Normal direction Nd1 of the opening surface of exhaust port 109*b* is perpendicular to the direction of rotation shaft Ar. Here, "perpendicular" includes a case where normal direction Nd1 is completely perpendicular and a state where normal direction Nd1 is inclined by about ±several degrees from the state of being completely perpendicular.

<First Heat Exchanger>

Figure 6:
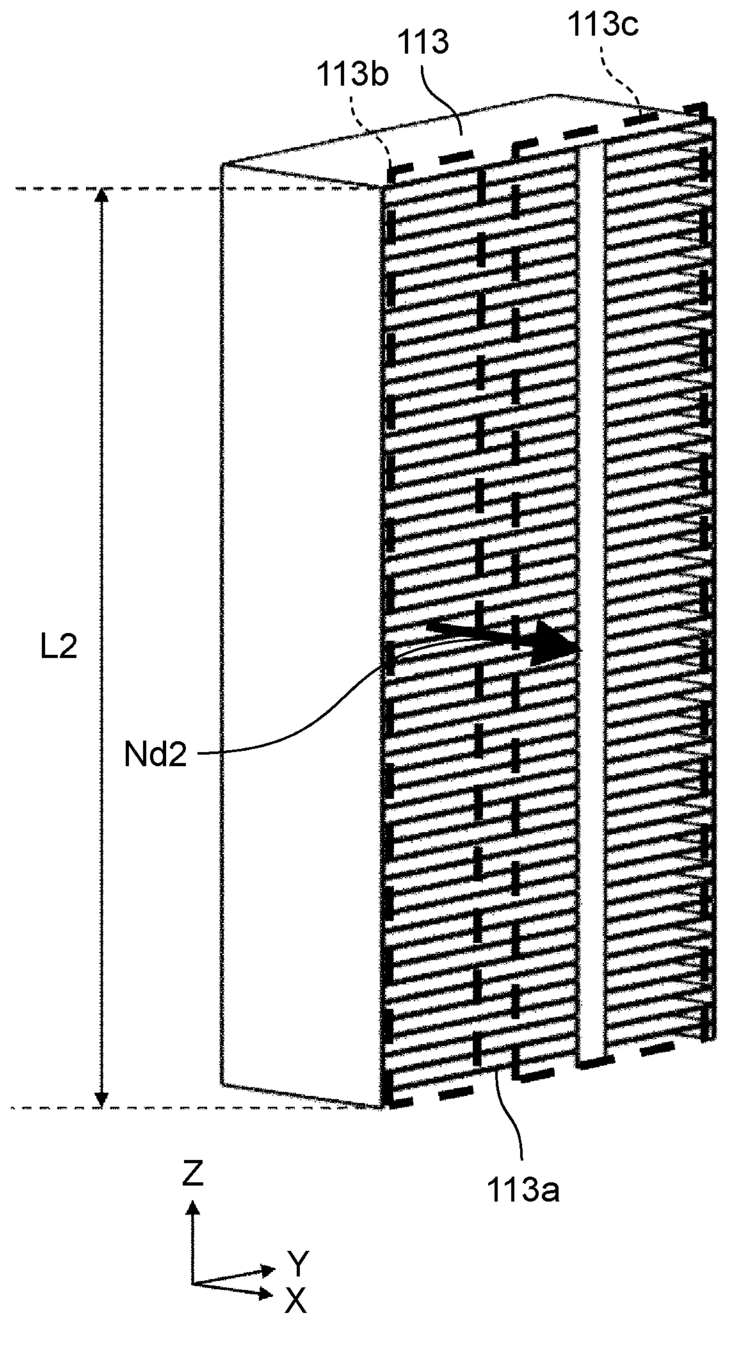
FIG. 6 is a perspective view of a first heat exchanger as viewed from a side wall of the housing.

Next, first heat exchanger 113 will be described with reference to FIG. 6. FIG. 6 is a perspective view of first heat exchanger 113 as viewed from a side where phosphor wheel is disposed.

First heat exchanger 113 has airflow inlet surface 113*b* into which the airflow generated by phosphor wheel 107 partially or entirely flows. Airflow inlet surface 113*b* is positioned to face exhaust port 109*b* of wheel case 109, and is positioned, for example, in parallel with the opening surface of exhaust port 109*b*. Normal direction Nd1 of the opening surface of exhaust port 109*b* is parallel to normal direction Nd2 of airflow inlet surface 113*b*. Here, "parallel" includes a case where normal direction Nd1 is completely parallel with normal direction Nd2 and a state where normal direction Nd1 is inclined by about ±several degrees from the state of being completely parallel. As a result, the airflow flowing out from exhaust port 109*b* of wheel case 109 is efficiently guided into first heat exchanger 113.

Figure 7:
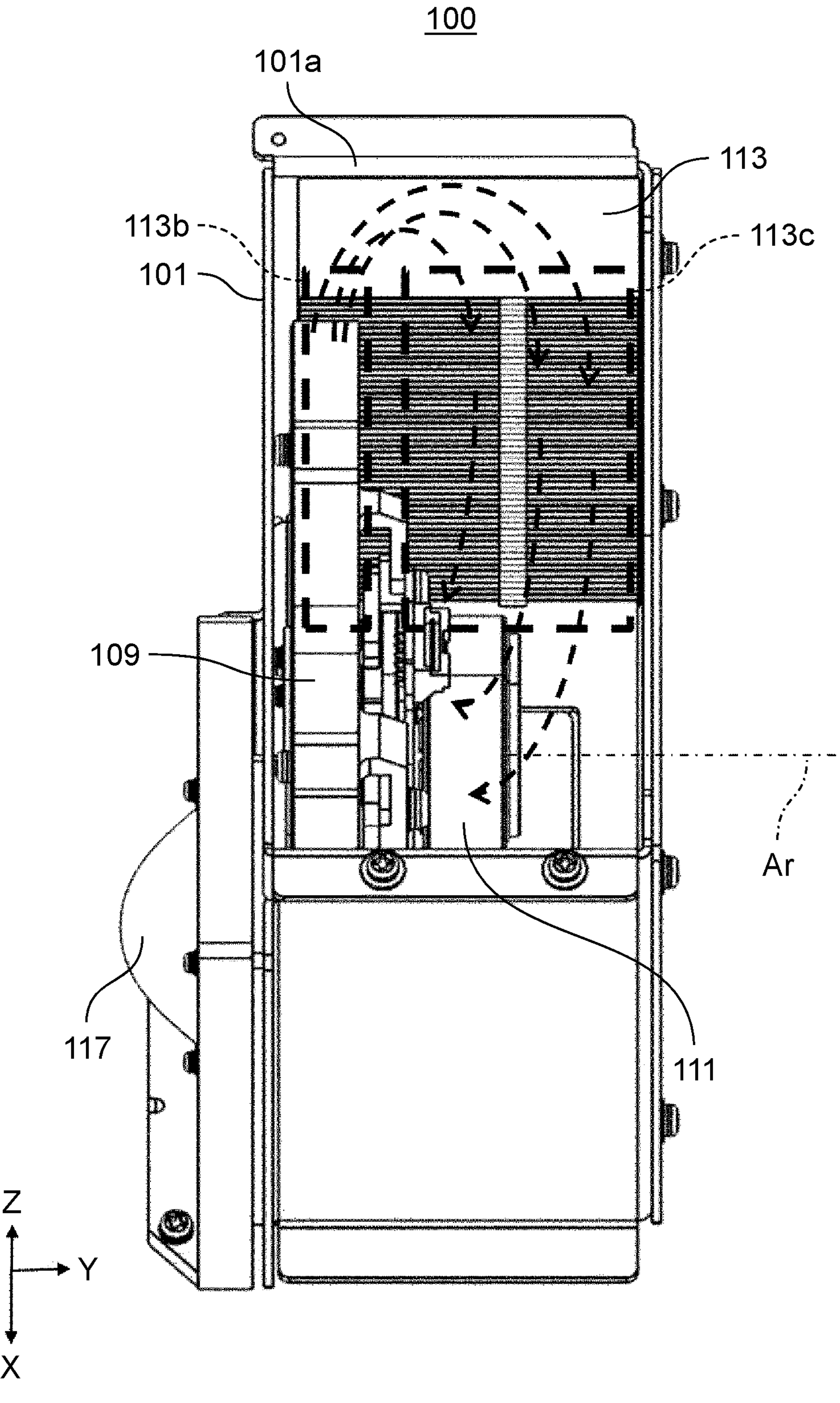
FIG. 7 is a perspective view for explaining a flow of a gas in the phosphor wheel unit.

First heat exchanger 113 has airflow outlet surface 113*c* from which the gas cooled by first heat exchanger 113 flows out. In the first exemplary embodiment, side wall 101*a* (see FIG. 7, an example of a wall portion) of housing 101 is disposed to oppose phosphor wheel 107 across first heat exchanger 113. Therefore, the airflow flowing out from exhaust port 109*b* of wheel case 109 and flowing straight between fins 113*a* of first heat exchanger 113 hits side wall 101*a*. Then the airflow change its direction and flows again between fins 113*a* towards the inner side of housing 101, and flows out from airflow outlet surface 113*c*. Airflow inlet surface 113*b* and airflow outlet surface 113*c* are disposed to be flush with each other. First heat exchanger 113 may be touching or away from side wall 101*a*. Or, a part of fins 113*a* of first heat exchanger 113 may serve as side wall 101*a*. Note that first heat exchanger 113 does not block the outflow of the air in a +X-direction of a flow path space formed by each fin 113*a* except for some caulking portions. Therefore, the sizes of regions of airflow inlet surface 113*b* and airflow outlet surface 113*c* change depending on, for example, a velocity of the airflow flowing between fins 113*a*, and a boundary between airflow inlet surface 113*b* and airflow outlet surface 113*c* is not clear. In FIGS. 6 and 7, airflow inlet surface 113*b* and airflow outlet surface 113*c* are divided into certain rectangular shapes in order to facilitate understanding. That is, in the surface of first heat exchanger 113 positioned on the opposite side to side wall 101*a*, an area facing exhaust port 109*b* of wheel case 109 mainly forms airflow inlet surface 113*b*, and an area not facing exhaust port 109*b* mainly forms airflow outlet surface 113*c*.

Next, a cooling process of the airflow in housing 101 will be described with reference to FIG. 7. Phosphor wheel 107 rotated by motor 111 generates an airflow in all radiation directions. The temperature of the generated airflow is increased by phosphor wheel 107, the flow of the generated airflow is then regulated by the internal shape of wheel case 109, and the generated airflow flows out from the opening surface of exhaust port 109*b* into airflow inlet surface 113*b* of first heat exchanger 113.

The airflow flowing into airflow inlet surface 113*b* passes straight between fins 113*a* of first heat exchanger 113, hits side wall 101*a*, and changes its direction, and flows out from airflow outlet surface 113*c*. During flowing from airflow inlet surface 113*b* to airflow outlet surface 113*c*, the airflow transfers its heat to first heat exchanger 113 and is cooled. The cooled airflow flows out from airflow outlet surface 113*c* into air suction port 109*a* of wheel case 109, and go on to circulate in housing 101, thereby cooling phosphor wheel 107.

[1-2. Effects and Others]

As described above, phosphor wheel unit 100 according to the first exemplary embodiment includes phosphor wheel 107 that emits fluorescent light from incident excitation light Lt, motor 111 that rotationally drives phosphor wheel 107, first heat exchanger 113 having the plurality of fins 113*a* that is arranged and airflow inlet surface 113*b* into which airflow generated by rotation of phosphor wheel 107 partially or entirely flows, and wheel case 109 that regulates a direction of the airflow generated by the rotation of phosphor wheel 107. On the plane perpendicular to the extending direction of base material 107*f* of phosphor wheel 107, direction Da of the airflow regulated by wheel case 109 is perpendicular to the direction of rotation shaft Ar of phosphor wheel 107. Airflow inlet surface 113*b* is disposed to intercept direction Da. The gas cooled by first heat exchanger 113 returns to phosphor wheel 107.

The gas heated up by phosphor wheel 107 flows at high-speed due to the rotation of phosphor wheel 107. The direction of this high-speed airflow is regulated by wheel case 109. Since airflow inlet surface 113*b* of first heat exchanger 113 is disposed to intercept direction Da of the regulated airflow, the gas at highest speed enters first heat exchanger 113. This causes a gas with a high velocity to flow through the entire space between the plurality of fins 113*a* of first heat exchanger 113, and thus the heat of the gas efficiently transfers to each fin 113*a*. Since the gas cooled in this manner returns to phosphor wheel 107, the cooling efficiency of phosphor wheel 107 improves.

Direction Da of the airflow regulated by wheel case 109 is parallel with normal direction Nd2 of airflow inlet surface 113*b* of first heat exchanger 113. Therefore, the gas regulated its direction by wheel case 109 enters airflow inlet surface 113*b* efficiently.

Normal direction Nd1 of the opening surface of exhaust port 109*b* of wheel case 109 is perpendicular to the direction of rotation shaft Ar of phosphor wheel 107, and airflow inlet surface 113*b* is parallel with the opening surface of exhaust port 109*b*. As a result, the airflow flowing out from exhaust port 109*b* orthogonally flows into airflow inlet surface 113*b* of first heat exchanger 113, and thus most of the airflow from exhaust port 109*b* enters first heat exchanger 113. Thus, the cooling efficiency improves. Direction Da is parallel with normal direction Nd1.

Further, side wall 101*a* is disposed to be hit by the gas flowing straight through airflow inlet surface 113*b* and a part of first heat exchanger 113. First heat exchanger 113 includes airflow outlet surface 113*c* from which the gas cooled by first heat exchanger 113 flows out. The gas flowing through airflow inlet surface 113*b* and the part of first heat exchanger 113 hits side wall 101*a*, changes its direction and flows out from airflow outlet surface 113*c*. By making the airflow hit side wall 101*a* and change its direction toward airflow outlet surface 113*c*, the airflow flows through between entire area of each fin 113*a* whose longitudinal dimension is in the direction of rotation shaft Ar. As a result, the space of housing 101 is effectively used, and the cooling efficiency improves with the same housing size.

Further, the length L1 of exhaust port 109*b* of wheel case 109 in a longitudinal direction is equal to the length L2 of airflow inlet surface 113*b* in the direction in which the plurality of fins 113*a* is arranged in parallel. Therefore, the airflow flows into between each fin 113*a* equally, and thus into a whole space of first heat exchanger 113 before flowing out from exhaust port 109*b* of wheel case 109.

Further, phosphor wheel 107 includes fins 107*d* on back surface 107*c* which is opposite of incident surface 107*a* where excitation light Lt enters. As a result, the amount of airflow generated by phosphor wheel 107 increases, and the cooling efficiency improves. In addition, fins 107*d* makes a surface area of back surface 107*c* larger, thereby also improving the cooling efficiency.

Housing 101 houses phosphor wheel 107, motor 111, and first heat exchanger 113. Second heat exchanger 103 having the plurality of fins 103*a* is disposed outside housing 101, and first heat exchanger 113 and second heat exchanger 103 are connected by heat conductive member 115. As a result, the heat of first heat exchanger 113 in housing 101 is conducted to second heat exchanger 103 outside housing 101 and is cooled outside housing 101. Thus, the cooling capacity of first heat exchanger 113 improves.

SECOND EXEMPLARY EMBODIMENT

Figure 8:
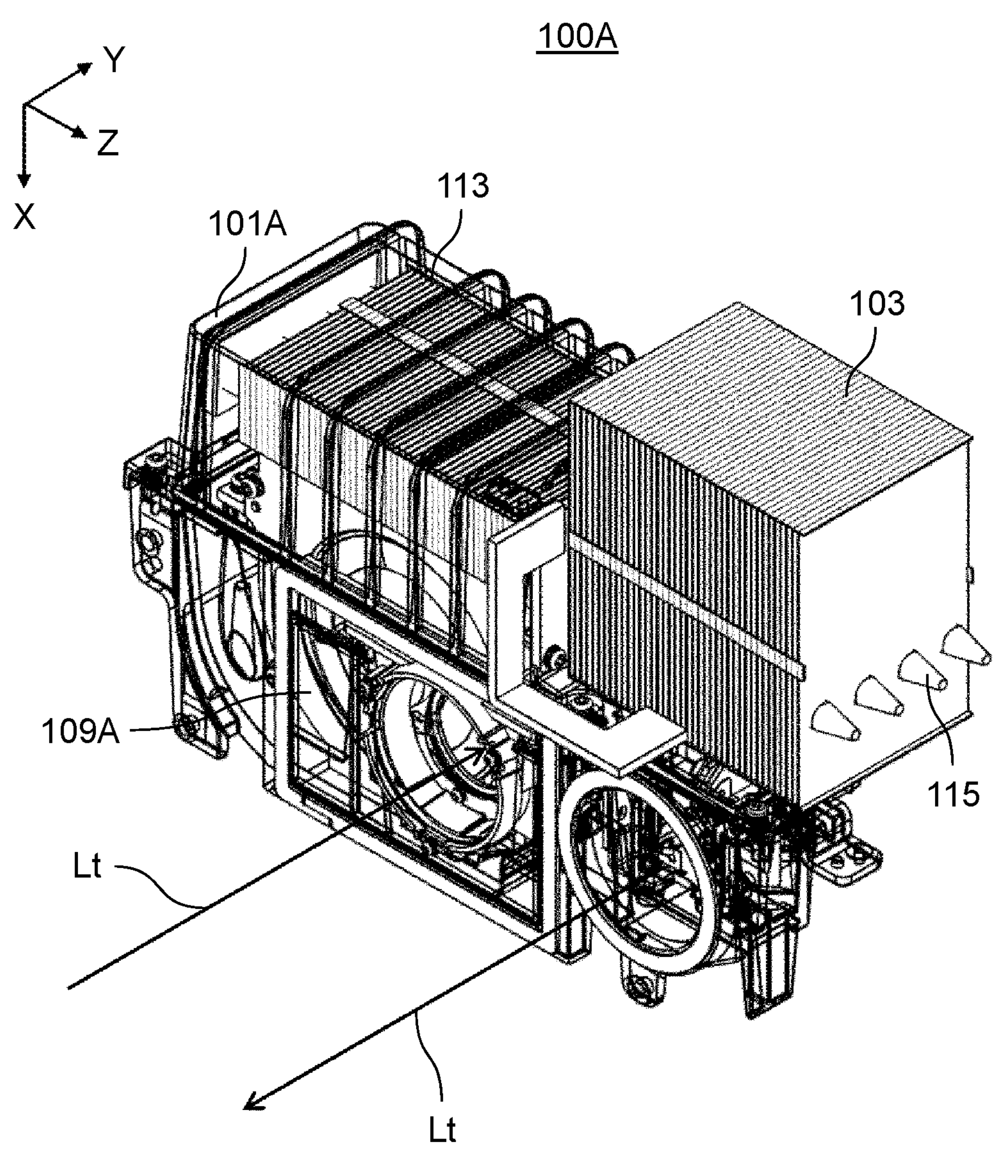
FIG. 8 is an entire perspective view of the phosphor wheel unit according to a second exemplary embodiment.
Figure 9A:
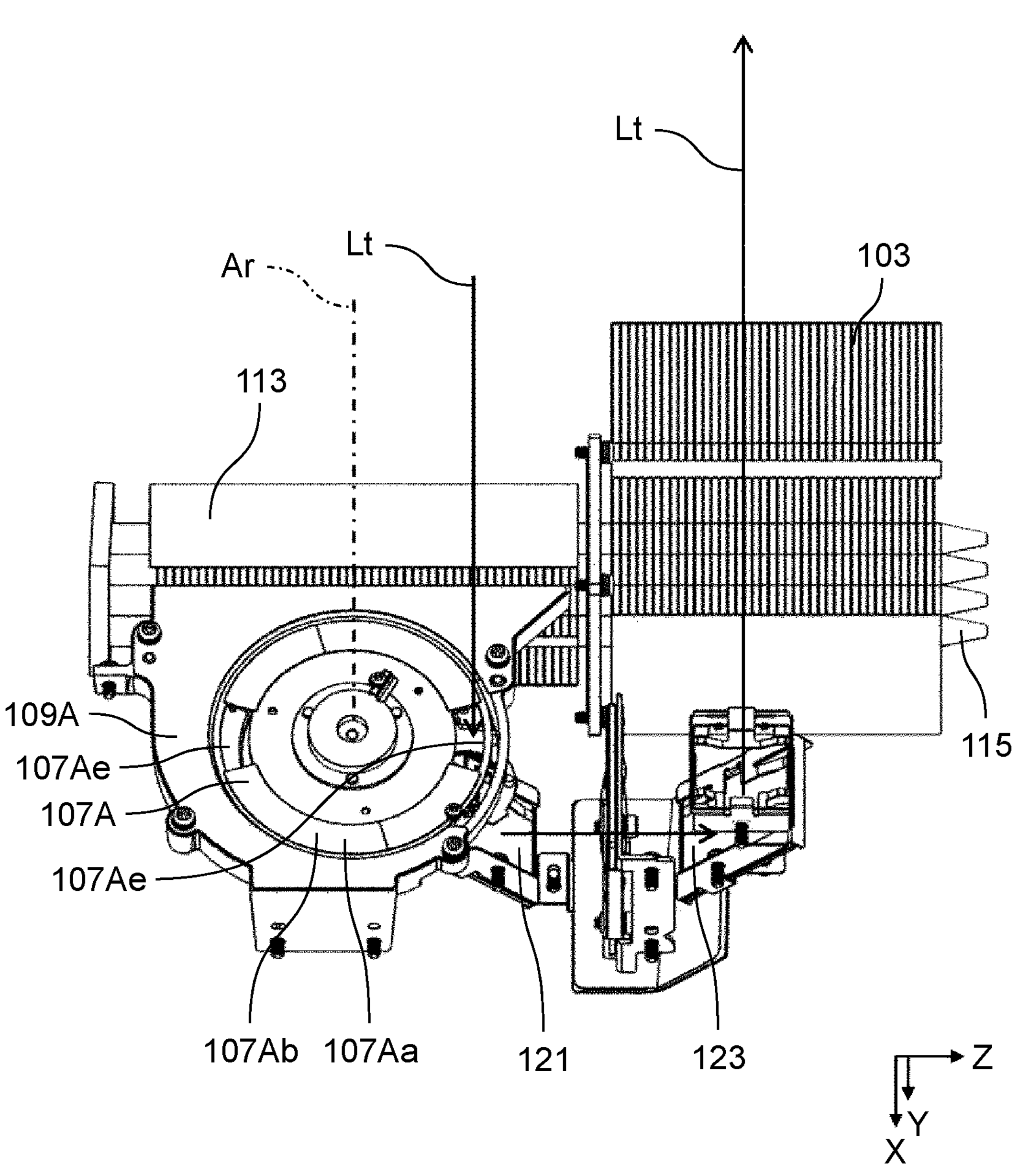
FIG. 9A is a perspective view of the phosphor wheel unit from which the housing is removed according to the second exemplary embodiment.
Figure 9B:
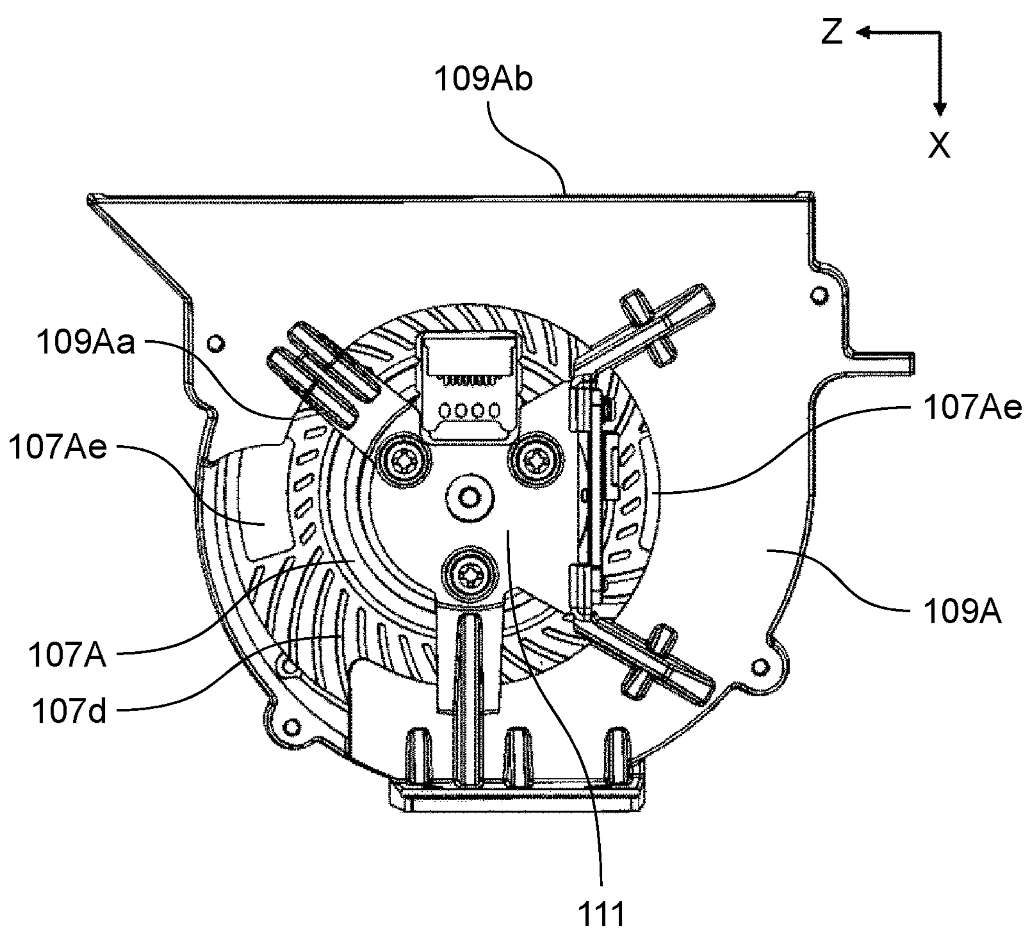
FIG. 9B is a rear view of a wheel case according to the second exemplary embodiment.

Next, phosphor wheel unit 100A according to a second exemplary embodiment will be described with reference to FIGS. 8, 9A, and 9B. FIG. 8 is an entire perspective view of phosphor wheel unit 100A of the second exemplary embodiment. FIG. 9A is a perspective view of phosphor wheel unit 100A without housing 101A. FIG. 9B is a rear view of wheel case 109A having exhaust port 109Ab.

As illustrated in FIGS. 8, 9A, and 9B, phosphor wheel unit 100A of the second exemplary embodiment is configured so that excitation light Lt is able to pass through phosphor wheel 107A for a time-division-manner use. Except for this point and the points described below, phosphor wheel unit 100 according to the first exemplary embodiment and phosphor wheel unit 100A according to the second exemplary embodiment have a same configuration. Phosphor wheel unit 100A according to the second exemplary embodiment is used in a projection display apparatus using the 1-chip Digital Light Processing (DLP) method.

As illustrated in FIG. 9A, phosphor wheel 107A of the second exemplary embodiment has two through holes 107Ae on the same circumference as phosphor layer 107Ab on incident surface 107Aa. Further, mirror 121 and mirror 123 as optical members that receive light having passed through the through holes 107Ae are disposed at an opposite side of phosphor wheel 107A to incident surface 107Aa. Therefore, excitation light Lt having passed through whichever of the through holes 107Ae is reflected by mirror 121 to travel with a 90-degree-bent traveling direction, and is further reflected by mirror 123 to travel with another 90-degree-bent traveling direction. As a result, excitation light Lt is emitted from phosphor wheel unit 100A in a time-division manner with an opposite direction to the one entering phosphor wheel 107A. As illustrated in FIG. 9B, air suction port 109Aa of wheel case 109A has an opening shape in which some portion is enlarged to a peripheral area so as not to interfere with excitation light Lt passing through the through holes 107Ae and to reach mirror 121. Therefore, in wheel case 109A on the back surface side, a part of annular wheel case 109A is chipped. Of excitation light Lt, light passing through the through holes 107Ae does not perform as excitation light, but here, the light is provided with an identical reference sign as the excitation light for the description.

In phosphor wheel unit 100A, as in the first exemplary embodiment, first heat exchanger 113 is disposed in the direction perpendicular to rotation shaft Ar of phosphor wheel 107A. Therefore first heat exchanger 113 has a larger size compared to a case where first heat exchanger 113 is disposed on the back surface side of phosphor wheel 107A along with mirror 121 which must be there, Also in phosphor wheel unit 100A of the second exemplary embodiment, the airflow flowing from phosphor wheel 107A is efficiently cooled in the same way as that in the first exemplary embodiment. Thus, the cooling efficiency of phosphor wheel unit 100A improves.

Figure 9C:
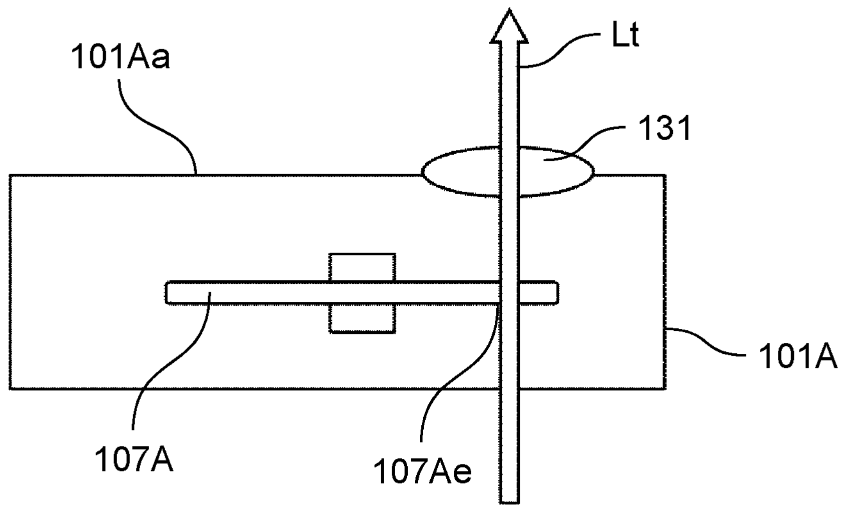
FIG. 9C is an explanatory diagram of the phosphor wheel unit according to a modification A of the second exemplary embodiment.
Figure 9D:
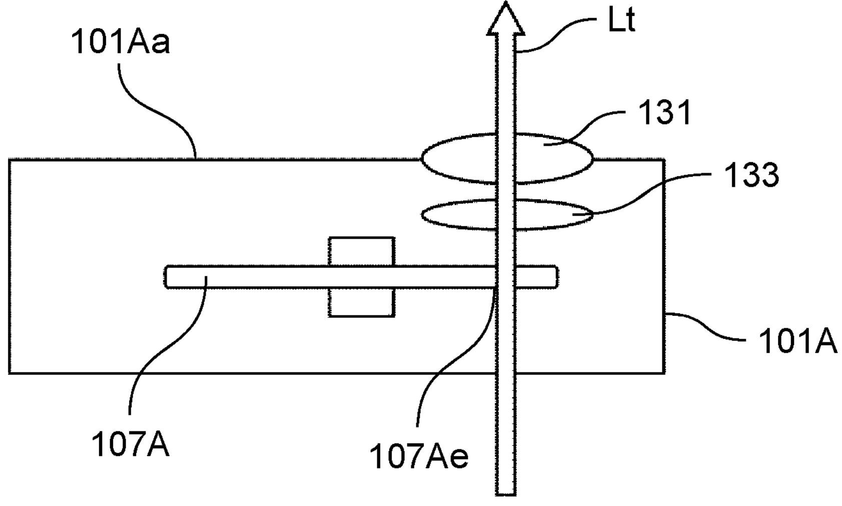
FIG. 9D is an explanatory diagram of the phosphor wheel unit according to a modification B of the second exemplary embodiment.

In the above-described second exemplary embodiment, mirror 121 is provided at the back surface side of phosphor wheel 107A as an optical component that receives light having passed through the through holes 107Ae. However the present disclosure is not limited thereto. For example, as in a modification A illustrated in FIG. 9C, new optical component 131 (for example, an optical lens or a light transparent glass) may be provided into wall 101Aa of housing 101A facing the back surface of phosphor wheel 107A without a mirror inside housing 101A, and excitation light Lt having passed through the through holes 107Ae may pass through optical component 131 and travel straight. As in a modification B illustrated in FIG. 9D, another new optical component 133 (for example, a lens or the like other than a mirror) may be further provided between the back surface of phosphor wheel 107A and optical component 131, and excitation light Lt having passed through the through holes 107Ae may travel straight.

Third Exemplary Embodiment

Figure 10:
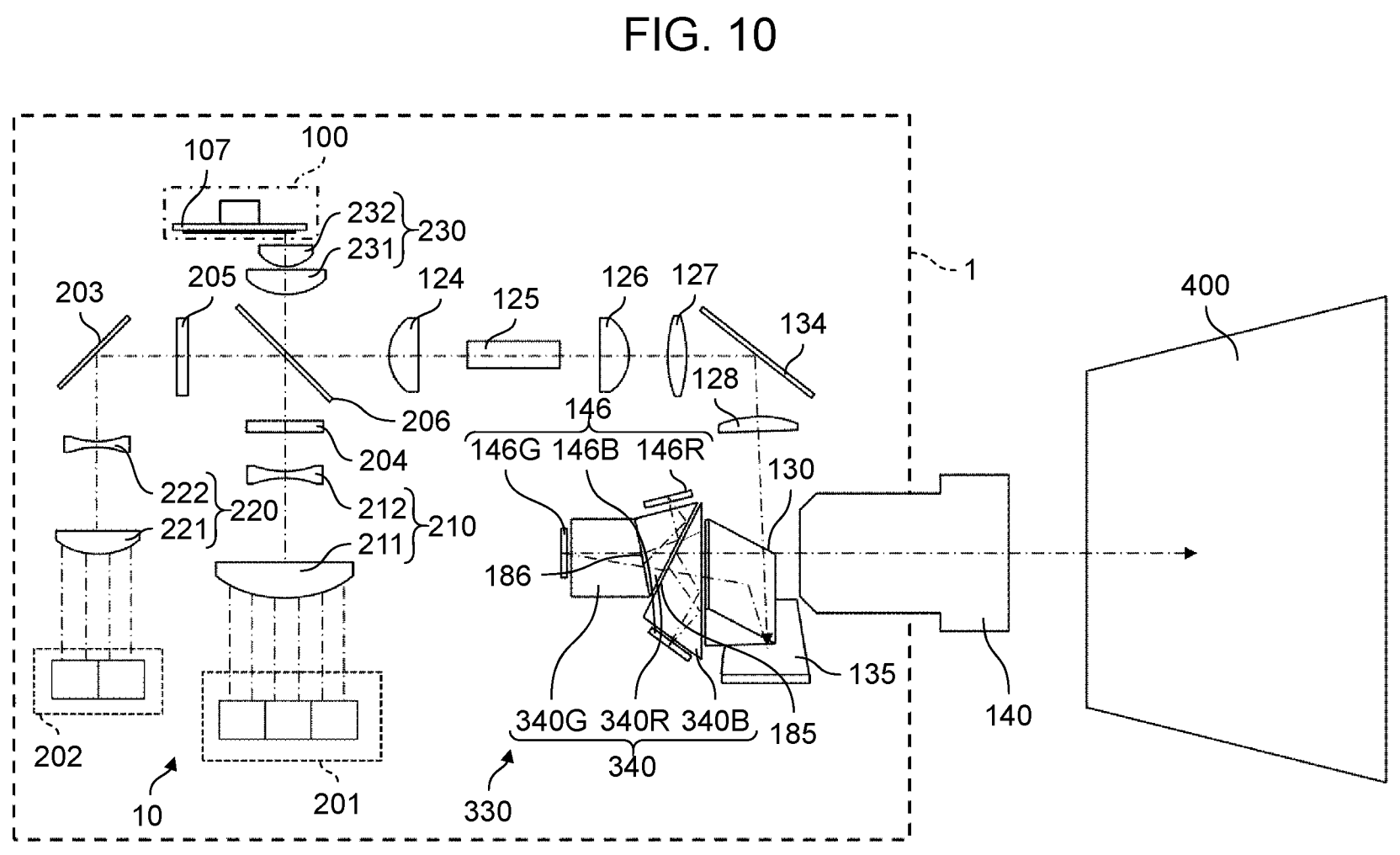

A third exemplary embodiment will be described below with reference to FIG. 10. The third exemplary embodiment is projection display apparatus 1 including phosphor wheel unit 100 according to the first exemplary embodiment. FIG. 10 is a schematic diagram illustrating an overall configuration of projection display apparatus 1 according to the third exemplary embodiment.

Projection display apparatus 1 of FIG. 10 includes illumination optical system 10 that supplies light, light modulation unit 330 that modulates the light for each color, and projection optical system 140 that projects image light generated by light modulation unit 330.

Illumination optical system 10 includes a plurality of blue semiconductor lasers (hereinafter, referred to as "LD") 201, 202 and a plurality of lens groups 210, 220. Lens group 210 includes convex lens 211 and concave lens 212, and is an afocal lens that re-collimates light emitted from LD 201. Further, lens group 220 includes convex lens 221 and concave lens 222, and is an afocal lens that re-collimates light emitted from LD 202. LD 201 and LD 202 emit color light in a blue region and emit linearly polarized light. LD 201 and LD 202 are disposed so that the light to be emitted becomes P-polarized light with respect to an incident surface of dichroic mirror 206.

When the light emitted from LD 201 passes through convex lens 211 and concave lens 212, the light is formed into collimated light having a desired light beam width, passes through diffuser plate 204, and then reaches dichroic mirror 206.

Dichroic mirror 206 transmits P-polarized blue light and reflects S-polarized blue light. Dichroic mirror 206 further reflects color light including green and red components. Since dichroic mirror 206 is disposed so that the blue light of LD 201 to enter dichroic mirror 206 becomes P-polarized light with respect to the incident surface of dichroic mirror 206, the light emitted from LD 201 straightly passes through dichroic mirror 206 and travels towards condenser lens group 230.

The blue light transmitted through dichroic mirror 206 enters condenser lens group 230. Condenser lens group 230 includes condenser lenses 231, 232, and forms a condensed spot near phosphor wheel 107 in phosphor wheel unit 100 while gradually condensing light.

Phosphor layer 107*b* excited by spot light emits, for example, yellow-region light containing green and red components. By the rotation of phosphor wheel 107 about rotation shaft Ar, a temperature rise of phosphor layer 107*b* due to the blue excitation light is reduced, and fluorescence conversion efficiency is stably maintained. The color light of the green and red-region components emitted from phosphor layer 107*b* is emitted as natural light whose polarizing state is random, is condensed again and converted into approximately collimated light by condenser lenses 232, 231, and then is reflected by dichroic mirror 206. The light reflected by dichroic mirror 206 enters condenser lens 124 and is condensed on rod integrator 125.

On the other hand, when the light emitted from LD 202 passes through convex lens 221 and concave lens 222, the light is formed into approximately collimated light having a desired light beam width, and a direction of the light is changed by mirror 203. Thereafter, the light passes through diffuser plate 205, and then reaches dichroic mirror 206.

Since the blue light of LD 202 that enters dichroic mirror 206 similarly becomes P-polarized light with respect to the incident surface of dichroic mirror 206, the light emitted from LD 202 straightly transmits through dichroic mirror 206, enters condenser lens 124, and is condensed on rod integrator 125.

In this way, the color light in a yellow region containing the green and red components emitted from phosphor wheel 107 is combined with the blue-region light from LD 202 by dichroic mirror 206, and the combined light enters rod integrator 125 as white light. The color light of the red, green, and blue components shows good three primary colors, and the color light obtains light emission characteristics of good white balance due to the color combining. Further, the light is converted into colors of desired chromaticity coordinates by performing ON/OFF control in Digital Micromirror Device (DMD) 146.

Rod integrator 125 is a solid rod made from a transparent member such as glass. Rod integrator 125 reflects incident light inside thereof a plurality of times, thereby generating light having a uniform light intensity distribution. Note that, rod integrator 125 may be a hollow rod whose inner wall is formed by a mirror surface.

Lenses 126, 127, 128 configure a relay lens that substantially image the light emitted from rod integrator 125 on DMD 146. The light emitted from rod integrator 125 is transmitted through lenses 126, 127, 128, is reflected by mirrors 134, 135, and then enters total internal reflection prism (hereinafter, referred to as "TIR prism") 130. TIR prism 130 includes a prism having a substantially triangular prism shape, and totally reflects light that enters the prism at an angle greater than or equal to a critical angle. The light that has entered TIR prism 130 from mirror 135 is totally reflected by the prism surface and enters color separator-combiner prism 340 of light modulation unit 330.

Light modulation unit 330 includes color separator-combiner prism 340 that separates a color of incident light, and DMDs 146B, 146R, 146G as light modulation elements that modulate the separated light.

Color separator-combiner prism 340 includes three prisms 340B, 340R, 340G. Blue-reflection dichroic coating layer 185 is formed on a surface of prism 340B in proximity to prism 340R, and red-reflection dichroic coating layer 186 is formed on a surface of prism 340R in proximity to prism 340G. Prism 340B is a prism having a substantially triangular prism shape, and light that has entered from TIR prism 130 passes through prism 340B and then reaches blue-reflection dichroic coating layer 185.

On the other hand, red-reflection dichroic coating layer 186 is configured to reflect a wavelength corresponding to red light and allows other light (green and blue light) to pass through. The white light that has entered from TIR prism 130 and has reached blue-reflection dichroic coating layer 185 enters blue-reflection dichroic coating layer 185 provided on prism 340B in color separator-combiner prism 340. The blue light is reflected, is totally reflected from the surface of prism 340B, and is then substantially imaged on DMD 146B.

On the other hand, the green light and the red light pass through blue-reflection dichroic coating layer 185, and then enter prism 340R. Prism 340R is a prism having a substantially triangular prism shape. Light that has entered from prism 340B passes through prism 340R, and then reaches red-reflection dichroic coating layer 186. As for the color light of the green and red-region components that has arrived, the color light of the red-region component is reflected by red-reflection dichroic coating layer 186, is totally reflected by the surface of prism 340R by a gap provided between prism 340R and prism 340B, and is then substantially imaged on DMD 146R.

The color light of the green-region component that has not been reflected by red-reflection dichroic coating layer 186 enters prism 340G. Prism 340R having a substantially quadrangular prism shape substantially images the green light on DMD 146G after passing through prism 340G.

DMDs 146B, 146R, 146G are modulated based on various control signals such as image signals to generate image light having different light intensities. Specifically, DMDs 146B, 146R, 146G include a plurality of movable micromirrors. Each micromirror basically corresponds to one pixel. DMDs 146B, 146R, 146G change the angles of the respective micromirrors based on various control signals, thereby switching whether to direct reflection light towards projection optical system 140.

The color light in the blue region reflected by DMD 146B enters prism 340B again, is totally reflected by the surface of prism 340B, and then enters blue-reflection dichroic coating layer 185 again. After the light reflected by blue-reflection dichroic coating layer 185 passes through prism 340B, light (DMD-ON light) to be projected as an image enters projection optical system 140 and then is emitted to projection surface 400. Light (DMD-OFF light) not to be projected as an image does not enter projection optical system 140 and is transmitted from prism 340B.

The color light in the red region reflected by DMD 146R enters prism 340R again, is totally reflected by the surface of prism 340R, and then enters red-reflection dichroic coating layer 186 again. The light reflected by red-reflection dichroic coating layer 186 passes through prism 340R, and again enters blue-reflection dichroic coating layer 185 provided on prism 340B. After the light transmitted through blue-reflection dichroic coating layer 185 passes through prism 340B, light (DMD-ON light) to be projected as an image enters projection optical system 140 and is then emitted to projection surface 400. Light (DMD-OFF light) not to be projected as an image does not enter projection optical system 140 and is transmitted from prism 340B.

The color light in the green region reflected by DMD 146G enters prism 340G again, and then enters red-reflection dichroic coating layer 186 again. The light transmitted through red-reflection dichroic coating layer 186 passes through prism 340R, and again enters blue-reflection dichroic coating layer 185 provided on prism 340B. After the light transmitted through blue-reflection dichroic coating layer 185 passes through prism 340B, light (DMD-ON light) to be projected as an image enters projection optical system 140 and is then emitted to projection surface 400. Light (DMD-OFF light) not to be projected as an image does not enter projection optical system 140 and is transmitted from prism 340B.

Projection optical system 140 includes a plurality of projection lenses, and augments the color-combined light emitted from color separator-combiner prism 340. In this way, after the color light in the blue region, the color light in the green region, and the color light in the red region are combined with each other again in color separator-combiner prism 340, the DMD-ON light reflected by DMDs 146B, 146R, 146G reaches projection surface 400 through projection optical system 140 and is perceived as a full-color image. The image includes both a still image and a moving image.

Since projection display apparatus 1 including phosphor wheel unit 100 improves the cooling efficiency of phosphor wheel unit 100, the amount of the yellow-region light obtained from the light emitted from LD 201 increase, and an image with higher luminance is projected. Projection display apparatus 1 according to the third exemplary embodiment is a projection display apparatus using 3-chip Digital Light Processing (DLP), but may be a projection display apparatus using 1-chip DLP.

Fourth Exemplary Embodiment

[4-1. Configuration]

Figure 11:
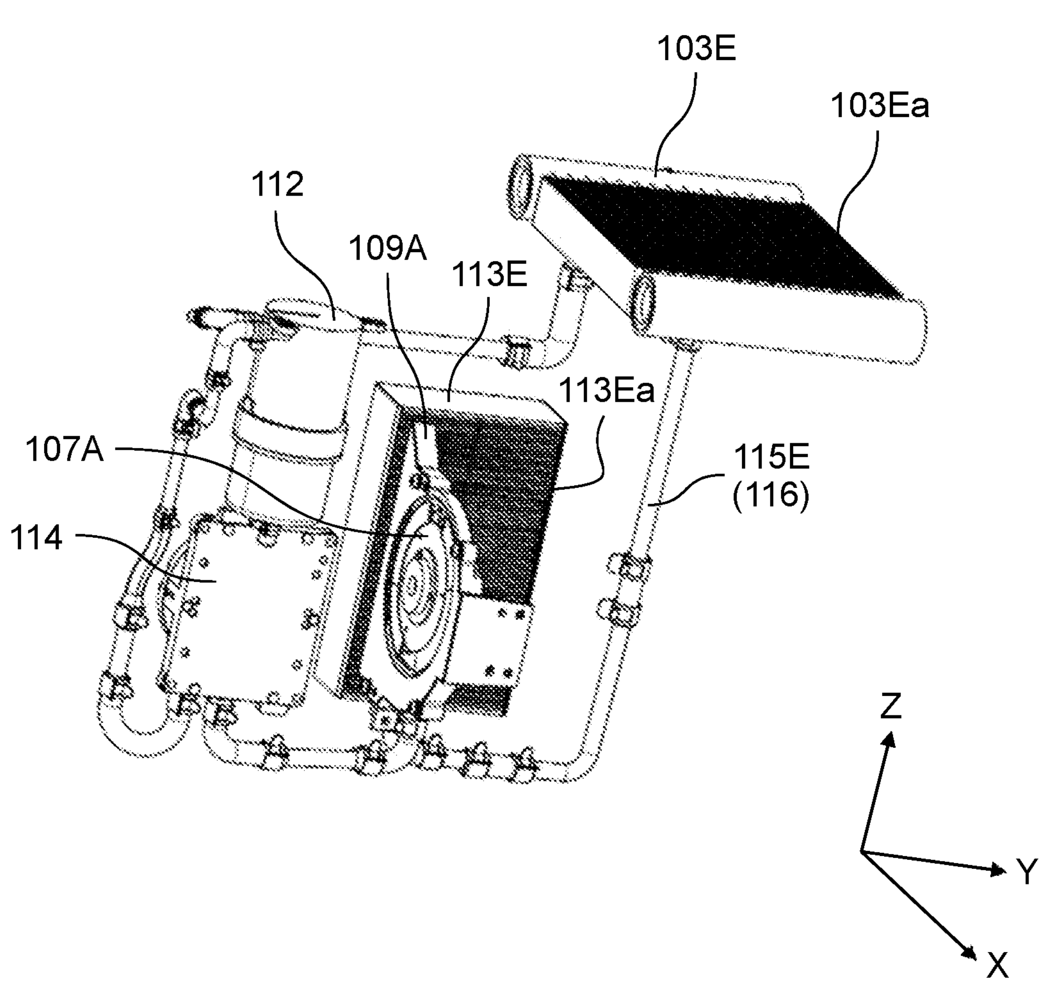
FIG. 11 is a perspective view of a main portion of the phosphor wheel unit from which the housing is removed according to a fourth exemplary embodiment.

A fourth exemplary embodiment will be described below with reference to FIG. 11. FIG. 11 is a perspective view of main parts of phosphor wheel unit 100E without a housing. Phosphor wheel unit 100E is configured so that first heat exchanger 113E and second heat exchanger 103E are liquid-cooled heat exchangers, and they are thermally connected to each other by cooling water 116. Phosphor wheel unit 100E is, therefore, different from the phosphor wheel units of the first and second exemplary embodiments in which first heat exchanger 113 and second heat exchanger 103 are air-cooled heat exchangers thermally connected to each other by heat conducive member 115.

Hereinafter, phosphor wheel unit 100E of the fourth exemplary embodiment will be described focusing on differences from phosphor wheel unit 100A of the second exemplary embodiment, and the same components are denoted by the same reference numerals, and description thereof will be omitted. In FIG. 11, the housing and a fan that sends cooling air to second heat exchanger 103E are omitted.

As illustrated in FIG. 11, phosphor wheel unit 100E includes first heat exchanger 113E, second heat exchanger 103E, tank 112, pump 114, and pipe 115E. Phosphor wheel 107A, wheel case 109A, motor 111, and first heat exchanger 113E are disposed in the housing (not illustrated).

First heat exchanger 113E includes a plurality of rectangular flat tubes 113Ea (an example of fin members) arranged in parallel in the Z-direction at regular intervals. Water passages are formed respectively in the plurality of flat tubes 113Ea, and are connected to each other. Cooling water 116 from pipe 115E circulates therein. While the gas from phosphor wheel 107A passes between the plurality of flat tubes 113Ea, the heat of the gas is transferred to flat tubes 113Ea. Flat tubes 113Ea are made of metal with high thermal conductivity, for example, copper or aluminum.

Second heat exchanger 103E includes a plurality of rectangular flat tubes 103Ea (an example of fin members) arranged in parallel in the Y-direction at regular intervals. Water passages are formed respectively in the plurality of flat tubes 103Ea, and are connected to each other. Cooling water 116 from pipe 115E circulates therein. While the gas sent from the fan, not illustrated, passes between the plurality of flat tubes 103Ea, the heat of cooling water 116 is transferred to the gas via the flat tubes 103Ea. Flat tubes 103Ea are made of metal with high thermal conductivity, for example, copper or aluminum. The array direction of the plurality of flat tubes 103Ea is not limited to the Y-direction, and can be appropriately set in accordance with the disposition of second heat exchanger 103E.

First heat exchanger 113E and second heat exchanger 103E are thermally connected to each other by cooling water 116 circulating in pipe 115E. That is, the heat of the gas from phosphor wheel 107A is transferred to cooling water 116 circulating in flat tubes 113Ea, and heats up cooling water 116 inside them. The heated cooling water 116 is then sent to the plurality of flat tubes 103Ea of second heat exchanger 103E through pipe 115E. The heat of cooling water 116 of flat tubes 103Ea of second heat exchanger 103E is then transferred to the gas sent from the fan via the plurality of flat tubes 103Ea, thereby cooling down cooling water 116. Tank 112 stores cooling water 116. Pump 114 circulates cooling water 116.

Similarly to first heat exchanger 113 of the second exemplary embodiment, first heat exchanger 113E of the fourth exemplary embodiment has an airflow inlet surface and an airflow outlet surface. And similarly to the second exemplary embodiment, the airflow inlet surface is disposed to face exhaust port 109Ab of wheel case 109A where an airflow generated by phosphor wheel 107A flows out, and the gas flowing in from the inlet surface flows out from the outlet surface. That is, the gas heated up by the heat of phosphor wheel 107A is discharged from exhaust port 109Ab, and flows into between the plurality of flat tubes 113Ea through the inlet surface of first heat exchanger 113E. As in the case of phosphor wheel unit 100A of the second exemplary embodiment, the gas that has flowed in hits the side wall of the housing (not illustrated), changes direction, flows between the plurality of flat tubes 113Ea again, and flows out from the outlet surface of first heat exchanger 113E toward air suction port 109Aa of wheel case 109A. As described above, while the gas flows between the plurality of flat tubes 113Ea of first heat exchanger 113E, the heat of the gas given by phosphor wheel 107A is transferred to cooling water 116 circulating therein through the plurality of flat tubes 113Ea, and the gas is cooled.

[4-2. Effects and the Like]

Phosphor wheel unit 100E of the fourth exemplary embodiment has the same effect as that of phosphor wheel units 100, 100A of the first and second exemplary embodiments. Further, first heat exchanger 113E and second heat exchanger 103E are of a liquid-cooled type, therefore this further improves the cooling capacity for phosphor wheel 107A. The fourth exemplary embodiment refers to the case where first heat exchanger 113 and second heat exchanger 103 of the second exemplary embodiment are replaced with liquid-cooled type first heat exchanger 113E and second heat exchanger 103E. However, first heat exchanger 113 and second heat exchanger 103 of the first exemplary embodiment can also be replaced with first heat exchanger 113E and second heat exchanger 103E.

Fifth Exemplary Embodiment

[5-1. Configuration]

Figure 12:
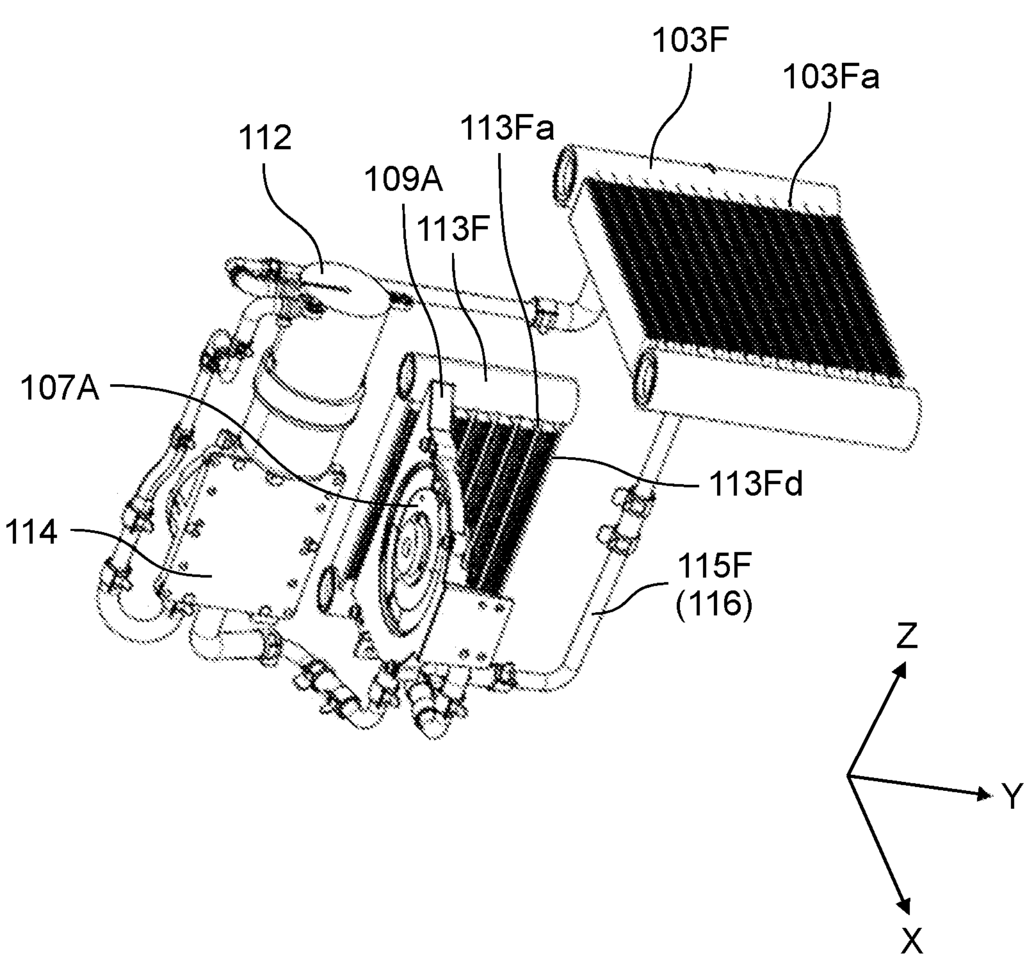
FIG. 12 is a perspective view of a main portion of the phosphor wheel unit from which the housing is removed according to a fifth exemplary embodiment.
Figure 13:
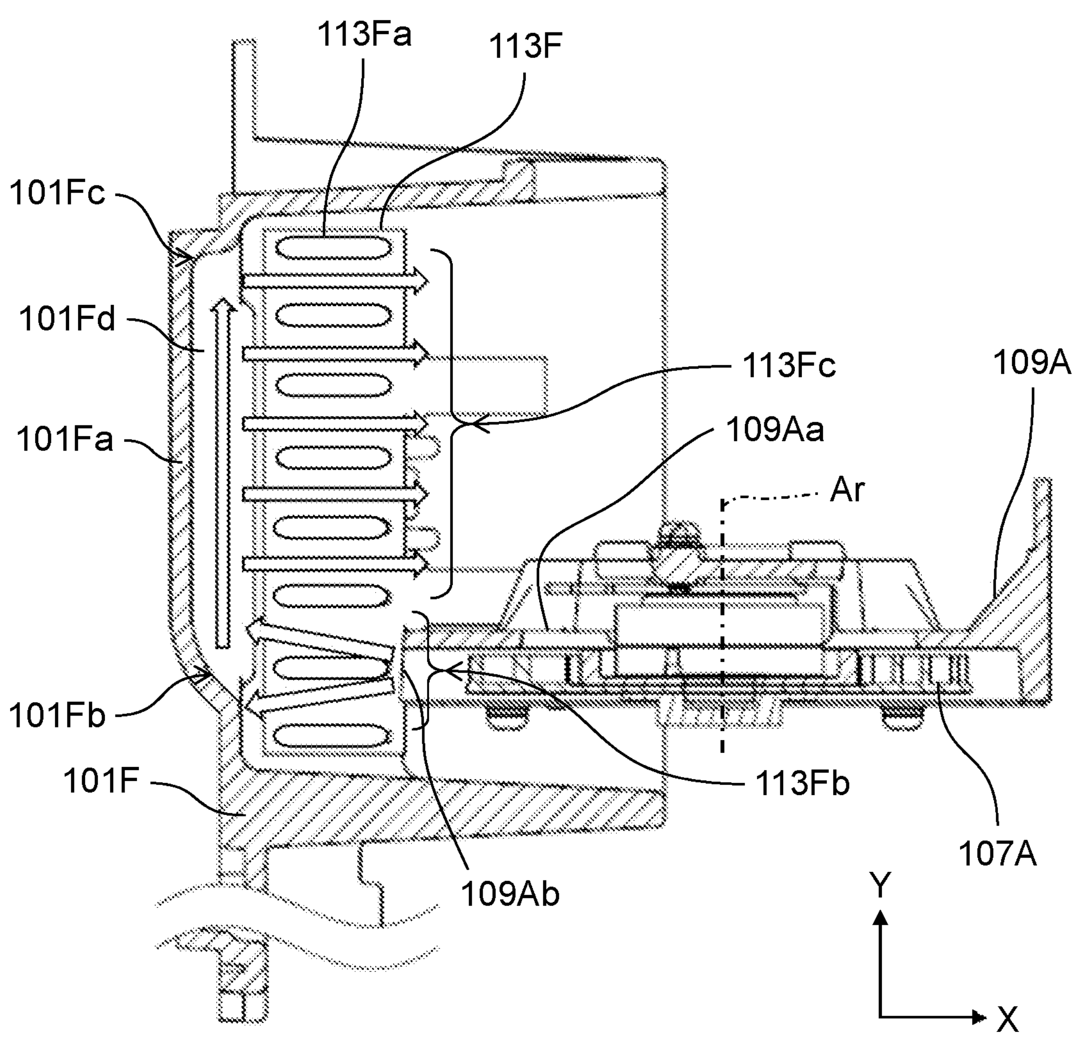
FIG. 13 is a cross-sectional view of the main portion of the phosphor wheel unit according to the fifth exemplary embodiment.

A fifth exemplary embodiment will be described below with reference to FIGS. 12 to 13. FIG. 12 is a perspective view of main parts of phosphor wheel unit 100F of the fifth exemplary embodiment without housing 101F. FIG. 13 is a cross-sectional view of a surface parallel to an XY-plane of phosphor wheel unit 100F according to the fifth exemplary embodiment. In phosphor wheel unit 100F, a plurality of rectangular flat tubes 113Fa included in first heat exchanger 113F is arranged in the Y-direction, and a corrugated fin 113Fd is arranged between the plurality of flat tubes 113Fa. These are different points of phosphor wheel unit 100F from phosphor wheel unit 100E of the fourth exemplary embodiment in which the plurality of rectangular flat tubes 113Ea is arranged in the Z-direction and no corrugated fin is used. As illustrated in FIG. 13, a further different point of phosphor wheel unit 100F from phosphor wheel unit 100E of the fourth exemplary embodiment is a shape of side wall 101Fa of housing 101F. Hereinafter, phosphor wheel unit 100F according to the fifth exemplary embodiment will be described focusing on the differences from phosphor wheel unit 100A of the second exemplary embodiment and phosphor wheel unit 100E of the fourth exemplary embodiment, and the same components are denoted by the same reference numerals, and description thereof will be omitted. In FIG. 12, the housing, and a fan that sends cooling air to second heat exchanger 103F are omitted.

As illustrated in FIG. 12, phosphor wheel unit 100F includes first heat exchanger 113F, second heat exchanger 103F, tank 112, pump 114, and pipe 115F. Phosphor wheel 107A, wheel case 109A, motor 111, and first heat exchanger 113F are disposed in the housing, not illustrated.

First heat exchanger 113F includes a plurality of rectangular flat tubes 113Fa (an example of fin members) arranged in parallel in the Y-direction at regular intervals. Water passages are formed respectively in the plurality of flat tubes 113Fa, and are connected to each other. Cooling water 116 from pipe 115F circulates therein. Flat tubes 113Fa are made of metal with high thermal conductivity, for example, copper or aluminum. Corrugated fins 113Fd (an example of fin members) are disposed respectively between the plurality of flat tubes 113Fa, and connected to flat tubes 113Fa. Corrugated fins 113Fd are wave-shaped metal sheets with high thermal conductivity such as copper or aluminum. While the gas flowing out of phosphor wheel 107A passes between corrugated fins 113Fd, the heat of the gas is transferred to cooling water 116 circulating in flat tubes 113Fa via corrugated fins 113Fd and flat tubes 113Fa.

Second heat exchanger 103F includes a plurality of rectangular flat tubes 103Fa (an example of fin members) arranged in parallel in the Y-direction at a regular interval. Water passages are formed respectively in the plurality of flat tubes 103Fa, and are connected to each other. Cooling water 116 from pipe 115F circulates therein. Flat tubes 103Fa are made of metal with high thermal conductivity, for example, copper or aluminum. Corrugated fins (an example of fin members) are disposed respectively between the plurality of flat tubes 103Fa, and are connected to flat tubes 103Fa. Corrugated fins are wave-shaped metal sheets like corrugated fins 113Fd. While a gas sent from the fan, not illustrated, passes between the corrugated fins, the heat of cooling water 116 circulating in flat tubes 103Fa is transferred to the gas through the corrugated fins. The array direction of the plurality of flat tubes 103Fa is not limited to the Y-direction, and can be appropriately set in accordance with the disposition of second heat exchanger 103F. Although second heat exchanger 103F of the fifth exemplary embodiment has the corrugated fins, it may not have the corrugated fins like second heat exchanger 103E of the fourth exemplary embodiment. Likewise second heat exchanger 103E of the fourth exemplary embodiment may have them as in the case of second heat exchanger 103F of the fifth exemplary embodiment.

First heat exchanger 113F and second heat exchanger 103F are thermally connected to each other by cooling water 116 circulating in pipe 115F. The heat of the gas from phosphor wheel 107A is transferred to cooling water 116 circulating in flat tubes 113Fa, through each corrugated fin 113Fd and flat tube 113Fa of first heat exchanger 113F, thereby heating up cooling water 116 inside. The heated-up cooling water 116 circulates in pipe 115F and is sent to the plurality of flat tubes 103Fa of second heat exchanger 103F. The heat of cooling water 116 in the flat tubes 103Fa is transferred to the gas sent from the fan, via the flat tubes 103Fa and corrugated fins 113Fd arranged between the plurality of flat tubes 103Fa, thereby cooling down cooling water 116.

As illustrated in FIG. 13, phosphor wheel unit 100F includes space 101Fd, through which an airflow passes, between side wall 101Fa of housing 101F and first heat exchanger 113F. Arrows illustrated in FIG. 13 indicate a flow of gas discharged from exhaust port 109Ab of wheel case 109A. In FIG. 13, illustration of the corrugated fins 113Fd and the water passages inside flat tubes 113Fa are omitted to illustrate the flow of the gas. As illustrated in FIG. 13, side wall 101Fa (an example of a wall portion) of housing 101F has first corner 101Fb located on an upstream side of the airflow (that is, near an airflow inlet surface side) and second corner 101Fc located on a downstream side of the airflow (that is, near an airflow outlet surface side). First corner 101Fb and second corner 101Fc have an arc shape in a cross section (XY-plane) including the direction of the airflow regulated by wheel case 109A and rotation shaft Ar. A radius of curvature of first corner 101Fb is larger than a radius of curvature of second corner 101Fc. Specifically, in the fifth exemplary embodiment, the radius of curvature of first corner 101Fb is 15 mm, and the radius of curvature of second corner 101Fc is 3 mm. That is, the radius of curvature of first corner 101Fb is 5 times the radius of curvature of second corner 101Fc, but the radius of curvature of first corner 101Fb is preferably 2 times or more the radius of curvature of second corner 101Fc in accordance with the velocity of the airflow or the like.

Similarly to first heat exchanger 113 of phosphor wheel unit 100A of the second exemplary embodiment, first heat exchanger 113F includes airflow inlet surface 113Fb in a position facing exhaust port 109Ab of wheel case 109A, and an airflow outlet surface 113Fc where gas flowing in from airflow inlet surface 113Fb flows out. The gas heated up by the heat of phosphor wheel 107A is discharged from exhaust port 109Ab of wheel case 109A, and flows in through airflow inlet surface 113Fb of first heat exchanger 113F into between wave-shaped corrugated fins 113Fd arranged between the flat tubes 113Fa. Then the gas passes between flat tubes 113Fa and corrugated fins 113Fd, reaches space 101Fd between side wall 101Fa and first heat exchanger 113F, and hits side wall 101Fa. In particular, on the upstream side of the airflow, the gas at first corner 101Fb flows along a curved surface of first corner 101Fb, travels in space 101Fd toward +Y-direction. While the airflow travels toward the far edge of airflow outlet surface 113Fc (+Y-direction), some of it changes its direction toward +X-direction and flows toward airflow outlet surface 113Fc. The gas having changed its direction from +Y- to +X-direction flows into between flat tubes 113Fa and corrugated fins 113Fd, and flows out from the airflow outlet surface 113Fc, and then goes to air suction port of wheel case 109A.

Here, since the radius of curvature of first corner 101Fb formed at the upstream side of the airflow is reasonably large, a high-speed airflow discharged from exhaust port 109Ab is caused to change its direction gradually from a −X- to the +Y-direction. This reduces generation of a vortex at first corner 101Fb. A curvature for second corner 101Fc formed at the downstream side of the airflow also leads to constriction of vortexes. Further, since an air volume at second corner 101Fc is smaller than that at first corner 101Fb, the smaller radius of curvature at second corner 101Fc makes the direction of the airflow turn sharply without the vortexes. Thus, the airflow also flows into edges of corrugated fins 113Fd at the downstream side of first heat exchanger 113F without expansion of housing 101F in the Y-direction. Thus, the heat of the gas efficiently is transferred to corrugated fins 113Fd keeping the size of housing 101F. As described above, the gas heated up by the heat of phosphor wheel 107A flows between the flat tubes 113Fa and corrugated fins 113Fd of first heat exchanger 113F. Thus, the gas transfers its heat to cooling water 116 circulating in the flat tubes 113Fa through corrugated fins 113Fd and the flat tubes 113Fa, and is cooled.

[5-2. Effects and the Like]

Phosphor wheel unit 100F of the fifth exemplary embodiment obtains the similar effect to that of phosphor wheel units 100A, 100E of the second and fourth exemplary embodiments. First heat exchanger 113F and second heat exchanger 103F are of a liquid-cooled type, and corrugated fins 113Fd are respectively disposed between the plurality of flat tubes 113Fa of first heat exchanger 113F, thereby further improving the cooling capacity for phosphor wheel 107A. Further, in phosphor wheel unit 100F, by forming space 101Fd through which the airflow passes between side wall 101Fa and first heat exchanger 113F, the airflow efficiently passes between flat tubes 113Fa and corrugated fins 113Fd of first heat exchanger 113F, therefore the cooling efficiency for phosphor wheel 107A further improves. Though the fifth exemplary embodiment refers to the case where first heat exchanger 113 and second heat exchanger 103 of the second exemplary embodiment are replaced with liquid-cooled type first heat exchanger 113F and second heat exchanger 103F, first heat exchanger 113 and second heat exchanger 103 of the first exemplary embodiment can also be replaced with first heat exchanger 113F and second heat exchanger 103F.

Other Exemplary Embodiments

The above exemplary embodiments have been described as being illustrative of the technique of the present disclosure. However, the techniques in the present disclosure are not limited to the above, and can also be applied to exemplary embodiments in which change, substitution, addition, omission, and the like are made. In addition, a new exemplary embodiment can be made by combining the components described in the above exemplary embodiments.

Figure 14:
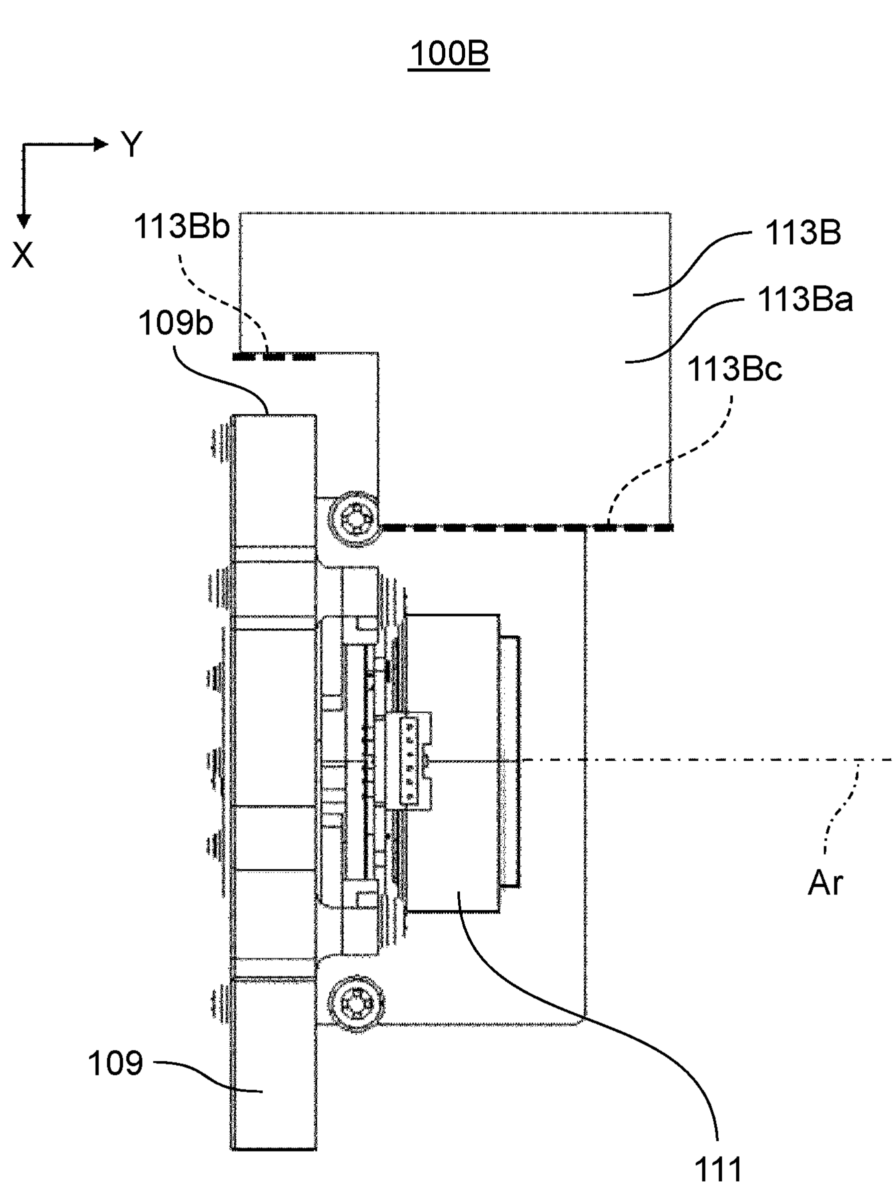
FIG. 14 is a top view of the phosphor wheel unit from which the housing is removed according to a first modification.

In the first and third exemplary embodiments described above, airflow inlet surface 113*b* and airflow outlet surface 113*c* of first heat exchanger 113 are disposed to be flush with each other, but the present disclosure is not limited thereto. As in a first modification illustrated in FIG. 14, in phosphor wheel unit 100B of the first modification, airflow outlet surface 113Bc of first heat exchanger 113B may be provided so that a distance between airflow outlet surface 113Bc and rotation shaft Ar in the X-direction is shorter than a distance between airflow inlet surface 113Bb and rotation shaft Ar. Therefore, fins 113Ba of first heat exchanger 113B may be formed into an L-shape, and first heat exchanger 113B may be disposed so that airflow outlet surface 113Bc projects from a plane of airflow inlet surface 113Bb towards motor 111 (that is, towards rotation shaft Ar).

According to this configuration, first heat exchanger 113B can be increased in size as compared with the first and third exemplary embodiment, thereby further improving the cooling efficiency. The same applies to phosphor wheel unit 100A, 100E, 100F of the second, fourth and fifth exemplary embodiments.

Figure 15:
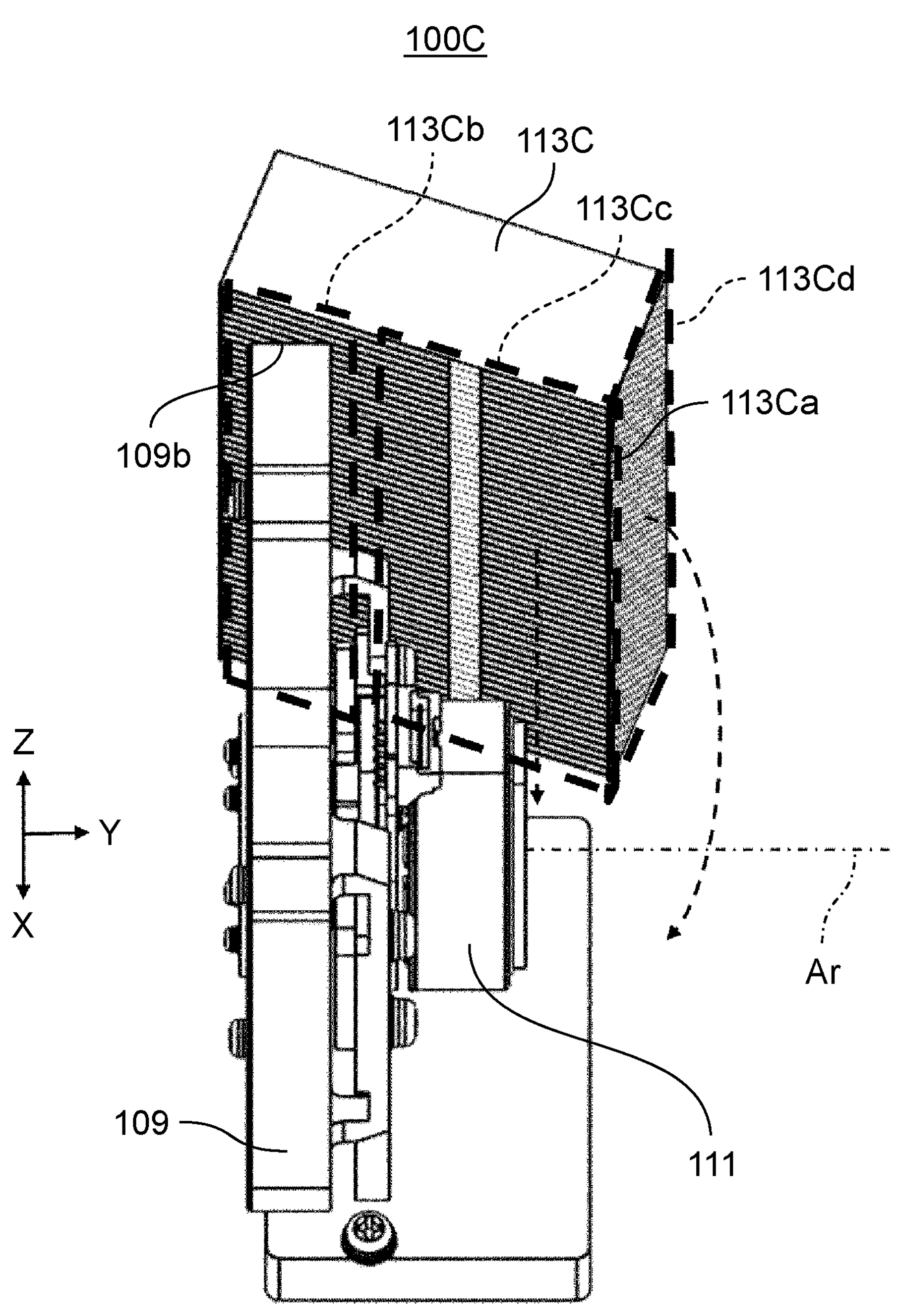
FIG. 15 is a perspective view of the phosphor wheel unit from which the housing is removed according to a second modification.

In the first and third exemplary embodiments described above, airflow inlet surface 113*b* of first heat exchanger 113 is parallel to the opening surface of exhaust port 109*b* of wheel case 109, but the present disclosure is not limited thereto. As in phosphor wheel unit 100C of a second modification illustrated in FIG. 15, airflow inlet surface 113Cb of first heat exchanger 113C may not be parallel as long as airflow inlet surface 113Cb faces an opening surface of exhaust port 109*b* of wheel case 109. Even in this case, since airflow inlet surface 113Cb is still disposed to intercept the airflow regulated in direction Da (see FIG. 5), an high-speed airflow discharged from exhaust port 109*b* flows into airflow inlet surface 113Cb. Also in this case, a distance between airflow outlet surface 113Cc and rotation shaft Ar in the X-direction is shorter than a distance between airflow inlet surface 113Cb and rotation shaft Ar, thus the cooling efficiency improves. In the second modification, first heat exchanger 113C also has airflow outlet surface 113Cd in addition to airflow outlet surface 113Cc. This makes the airflow reach also to each corner of fins 113Ca, and thus the heat of a gas is more efficiently transferred to first heat exchanger 113C. The same applies to phosphor wheel unit 100A, 100E, 100F of the second, fourth and fifth exemplary embodiments.

Figure 16:
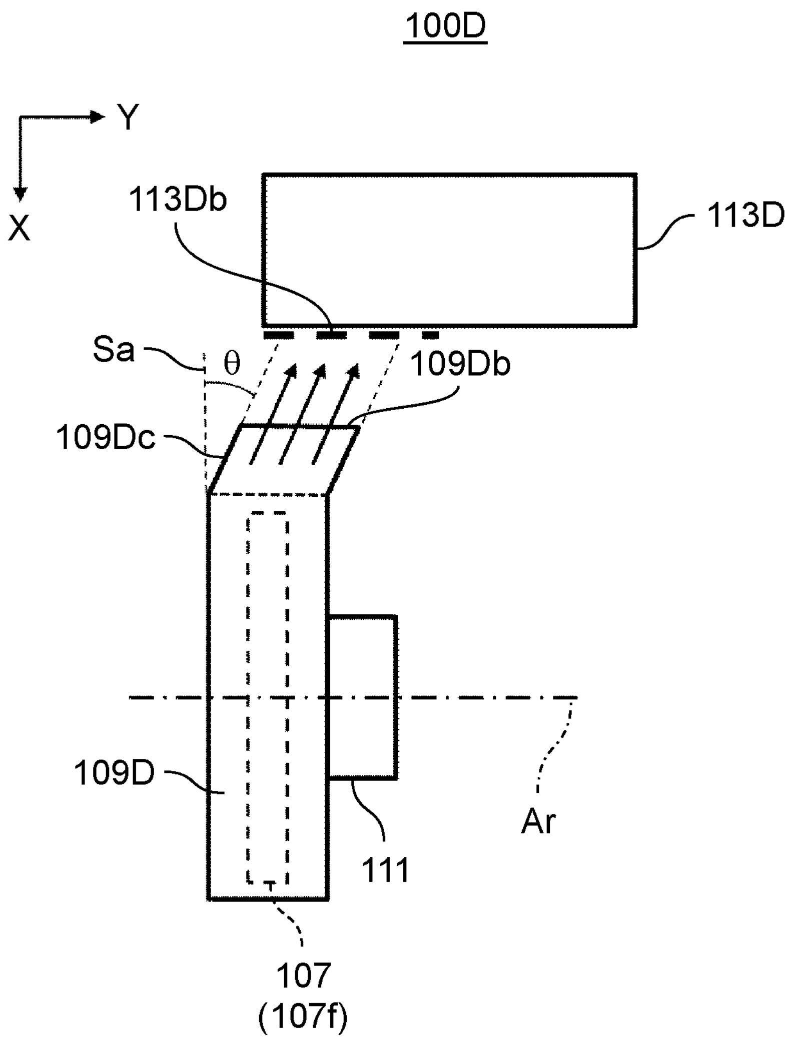
FIG. 16 is a top view of the phosphor wheel unit from which the housing is removed according to a third modification.

In the first and third exemplary embodiments described above, the direction of the airflow flowing out of wheel case 109 is regulated in the direction perpendicular to the direction of rotation shaft Ar of phosphor wheel 107, but the present disclosure is not limited thereto. Like phosphor wheel unit 100D of a third modification illustrated in FIG. 16, any case can be included in which an airflow direction regulated by wheel case 109D just intersects, not orthogonally, with the direction of rotation shaft Ar of phosphor wheel 107 on a plane (XY-plane) perpendicular to an extending direction of base material 107*f* of phosphor wheel 107. Therefore, wheel case 109D may have outlet cover 109Dc extending in a direction with an angle θ to plane Sa which is perpendicular to rotation shaft Ar on the plane (XY-plane). In this case, the direction of the airflow regulated by wheel case 109D and flowing out of exhaust port 109Db becomes a direction inclined with respect to the direction of rotation shaft Ar. Thus, the airflow obliquely flows into airflow inlet surface 113Db of first heat exchanger 113D. On the plane (XY plane) perpendicular to the extending direction of base material 107*f*, the angle θ is, for example, between 0 degrees and 45 degrees. Note that first heat exchanger 113D may be disposed to be inclined with respect to rotation shaft Ar as in the second modification. In this case, the airflow flowing out from exhaust port 109Db and regulated by wheel case 109D orthogonally flows into airflow inlet surface 113Db of first heat exchanger 113D. Further, outlet cover 109Dc of wheel case 109D may have one side extended perpendicularly to rotation shaft Ar, and the other side extended in a direction with an acute angle of angle θ. The same applies to phosphor wheel unit 100A, 100E, 100F of the second, fourth and fifth exemplary embodiments.

In the first to fifth exemplary embodiments described above, wheel case 109, 109A functions as a regulating member that regulates the direction of the airflow generated by phosphor wheel 107, 107A, but the present disclosure is not limited thereto. For example, instead of wheel case 109, 109A, a combination of a wall of housing 101 and a wall member disposed between motor 111 and phosphor wheel 107, 107A may be also used as the regulating member.

In the first to fifth exemplary embodiments described above, fins 107*d* are disposed on back surface 107*c* of phosphor wheel 107, 107A, but the present disclosure is not limited thereto. Phosphor wheel 107, 107A may not include fins 107*d*. Even without fins 107*d*, the rotation itself generates a radial flow around phosphor wheel 107, 107A.

As described above, the exemplary embodiments have been given to exemplify the techniques in the present disclosure. For that purpose, the accompanying drawings and the detailed description have been provided. Therefore, in order to illustrate the above techniques, the components illustrated in the accompanying drawings and described in the detailed description can include components not only essential but also dispensable for solving the problems. Thus, it should not be immediately construed that all components, which include those dispensable, must be included just because those are illustrated in the accompanying drawings or described in the detailed description.

The above exemplary embodiments are provided to exemplify the techniques in the present disclosure. Therefore, various changes, replacements, additions, omissions, and the like can be made, within the scope of the claims and equivalents thereof.

OVERVIEW OF EXEMPLARY EMBODIMENTS (1) A phosphor wheel unit of the present disclosure includes a phosphor wheel that converts incident light into fluorescent light and emits the fluorescent light, a motor that rotationally drives the phosphor wheel, a first heat exchanger having a plurality of fin members that is arranged and an airflow inlet surface through which an airflow generated by rotation of the phosphor wheel partially or entirely flows in, and a regulating member that regulates a direction of the airflow generated by the rotation of the phosphor wheel. The direction of the airflow regulated by the regulating member and a direction perpendicular to a rotation shaft of the phosphor wheel form an angle of between 0 degrees and 45 degrees on a surface perpendicular to an extending direction of a base material of the phosphor wheel. The airflow inlet surface is disposed intercepting the direction of the airflow regulated by the regulating member. The first heat exchanger cools a gas forming the airflow and the cooled gas returns to the phosphor wheel.

The direction of the airflow flowing radially by the rotation of the phosphor wheel is regulated by the regulating member. Since the airflow inlet surface of the first heat exchanger is disposed intercepting the regulated airflow direction, the gas at highest-speed enters the first heat exchanger. This makes the gas with a high velocity flow through the entire space between the plurality of fin members of the first heat exchanger, and thus the gas is efficiently cooled. Further, since the gas cooled in this manner returns to the phosphor wheel, cooling efficiency of the phosphor wheel improves.

(2) In the phosphor wheel unit of (1), on the plane perpendicular to the extending direction of the base material of the phosphor wheel, the direction of the airflow regulated by the regulating member is a direction perpendicular to the rotation shaft of the phosphor wheel. Therefore, as the airflow in the direction of the rotation shaft is not regulated, the air-pressure-loss of the flow is small and thereby keeps the airflow at an high speed.

(3) In the phosphor wheel unit of (1) or (2), the direction of the airflow regulated by the regulating member is parallel to a normal direction of the airflow inlet surface of the first heat exchanger.

(4) In the phosphor wheel unit of any one of (1) to (3), the regulating member is a wheel case that houses the phosphor wheel, and the wheel case has an air suction port through which a gas flows in and an exhaust port from which the gas that has cooled the phosphor wheel is discharged.

(5) In the phosphor wheel unit of (4), the direction of the airflow regulated by the wheel case is parallel to a normal direction of an opening surface of the exhaust port.

(6) In the phosphor wheel unit of (4) or (5), the exhaust port has an opening surface whose normal direction is perpendicular to the direction of the rotation shaft of the phosphor wheel.

(7) In the phosphor wheel unit of any one of (4) to (6), a normal direction of the airflow inlet surface is parallel to a normal direction of an opening surface of the exhaust port.

(8) In the phosphor wheel unit of any one of (4) to (7), a longitudinal dimension of the exhaust port of the wheel case is equal to a length of the airflow inlet surface of the first heat exchanger facing the exhaust port in a same direction as the longitudinal dimension.

(9) The phosphor wheel unit of any one of (1) to (8) includes a wall portion disposed in a position to be hit by a gas that has flowed in from the airflow inlet surface of the first heat exchanger and has passed through a part of the first heat exchanger. The first heat exchanger has the airflow outlet surface from which the gas cooled by the first heat exchanger flows out. The gas flowing from the airflow inlet surface into the first heat exchanger hits the wall portion before flowing out from the airflow outlet surface.

(10) In the phosphor wheel unit of (9), the airflow inlet surface and the airflow outlet surface of the first heat exchanger are disposed to be flush with each other.

(11) In the phosphor wheel unit of (9), the airflow outlet surface of the first heat exchanger is disposed so as to be closer to the rotation shaft of the phosphor wheel than the airflow inlet surface is.

(12) In the phosphor wheel unit of (9), the wall portion has a first corner located at a side of the airflow inlet surface and a second corner located at a side of the airflow outlet surface. The first corner and the second corner are in an arc shape in a cross section including the direction of the airflow regulated by the regulating member, and the first corner has a radius of curvature larger than a radius of curvature of the second corner.

(13) In the phosphor wheel unit of any one of (1) to (12), the phosphor wheel includes a fin on a back surface which is one side of the phosphor wheel where the incident light does not enter.

(14) The phosphor wheel unit of any one of (1) to (13) includes: a housing that houses the phosphor wheel, the motor, and the first heat exchanger; and a second heat exchanger disposed outside the housing and has the plurality of fin members. The first heat exchanger and the second heat exchanger are thermally connected by a heat transfer material.

(15) The phosphor wheel unit of (14) includes a fan that sends cooling air to the second heat exchanger.

(16) In the phosphor wheel unit of any one of (1) to (15), the phosphor wheel has a through hole through which the incident light passes.

(17) The phosphor wheel unit of (16) includes an optical member that receives light having passed through the through hole of the phosphor wheel on the back surface side of the phosphor wheel.

(18) In the phosphor wheel unit of (17), the optical member is a mirror.

(19) A projection display apparatus of the present disclosure includes the phosphor wheel unit of any one of (1) to (18).

The present disclosure is applicable to the phosphor wheel unit that allows light to enter and emits fluorescent light, and the projection display apparatus including the phosphor wheel unit.

What is claimed is:

1. A phosphor wheel unit comprising:

a phosphor wheel that converts incident light into fluorescent light and emits the fluorescent light;

a motor that rotationally drives the phosphor wheel;

a first heat exchanger having a plurality of fin members that is arranged and an airflow inlet surface through which an airflow generated by rotation of the phosphor wheel partially or entirely flows in; and a wheel case that regulates a direction of the airflow generated by the rotation of the phosphor wheel, wherein the direction of the airflow regulated by the wheel case and a direction perpendicular to a rotation shaft of the phosphor wheel form an angle of between 0 degrees and 45 degrees on a plane perpendicular to an extending direction of a base material of the phosphor wheel, the airflow inlet surface is disposed intercepting the direction of the airflow regulated by the wheel case, the first heat exchanger cools a gas forming the airflow and the cooled gas returns to the phosphor wheel, the wheel case houses the phosphor wheel, the wheel case has an air suction port through which a gas flows in and an exhaust port from which the gas that has cooled the phosphor wheel is discharged, the phosphor wheel unit further comprises a wall portion disposed in a position to be hit by a gas flowing in from the airflow inlet surface and passing through a part of the first heat exchanger, the first heat exchanger includes an airflow outlet surface from which the gas cooled by the first heat exchanger flows out, and the gas flowing into the first heat exchanger from the airflow inlet surface hits the wall portion before flowing out from the airflow outlet surface.

2. The phosphor wheel unit according to claim 1, wherein the direction of the airflow regulated by the wheel case is a direction perpendicular to the rotation shaft of the phosphor wheel on the plane perpendicular to the extending direction of the base material of the phosphor wheel.

3. The phosphor wheel unit according to claim 1, wherein the direction of the airflow regulated by the wheel case is parallel to a normal direction of the airflow inlet surface.

4. The phosphor wheel unit according to claim 1, wherein the direction of the airflow regulated by the wheel case is parallel to a normal direction of an opening surface of the exhaust port.

5. The phosphor wheel unit according to claim 1, wherein a normal direction of an opening surface of the exhaust port is perpendicular to a direction of the rotation shaft of the phosphor wheel.

6. The phosphor wheel unit according to claim 1, wherein a normal direction of the airflow inlet surface is parallel to a normal direction of an opening surface of the exhaust port.

7. The phosphor wheel unit according to claim 1, wherein a longitudinal dimension of the exhaust port of the wheel case is equal to a length of the airflow inlet surface of the first heat exchanger facing the exhaust port in a same direction as the longitudinal dimension.

8. The phosphor wheel unit according to claim 1, wherein the airflow inlet surface and the airflow outlet surface are disposed to be flush with each other.

9. The phosphor wheel unit according to claim 1, wherein the airflow outlet surface is closer to the rotation shaft of the phosphor wheel than the airflow inlet surface is.

10. The phosphor wheel unit according to claim 1, wherein the wall portion has a first corner located near the airflow inlet surface and a second corner located near the airflow outlet surface, the first corner and the second corner are in an arc shape in a cross section including the direction of the airflow regulated by the wheel case, and the first corner has a radius of curvature larger than a radius of curvature of the second corner.

11. The phosphor wheel unit according to claim 1, wherein the phosphor wheel includes:

an incident surface where the incident light enters, a back surface that is opposite to the incident surface, and a fin on the back surface.

12. The phosphor wheel unit according to claim 1, further comprising:

a housing that houses the phosphor wheel, the motor, and the first heat exchanger; and a second heat exchanger disposed outside the housing and having a plurality of fin members, wherein the first heat exchanger and the second heat exchanger are thermally connected by a heat transfer material.

13. The phosphor wheel unit according to claim 12, further comprising a fan that sends cooling air to the second heat exchanger.

14. The phosphor wheel unit according to claim 1, wherein the phosphor wheel has a through hole through which the incident light passes.

15. The phosphor wheel unit according to claim 14, wherein the phosphor wheel further includes:

an incident surface where the incident light enters, and a back surface that is opposite to the incident surface, the phosphor wheel unit further comprises an optical member that is disposed on the back surface of the phosphor wheel and receives light having passed through the through hole of the phosphor wheel.

16. The phosphor wheel unit according to claim 15, wherein the optical member includes a mirror.

17. A projection display apparatus comprising the phosphor wheel unit according to claim 1.

18. A phosphor wheel unit comprising:

a phosphor wheel that converts incident light into fluorescent light and emits the fluorescent light;

a motor that rotationally drives the phosphor wheel;

a first heat exchanger having a plurality of fin members that is arranged and an airflow inlet surface through which an airflow generated by rotation of the phosphor wheel partially or entirely flows in; and a wheel case that regulates a direction of the airflow generated by the rotation of the phosphor wheel, wherein the direction of the airflow regulated by the wheel case and a direction perpendicular to a rotation shaft of the phosphor wheel form an angle of between 0 degrees and 45 degrees on a plane perpendicular to an extending direction of a base material of the phosphor wheel, the airflow inlet surface is disposed intercepting the direction of the airflow regulated by the wheel case, the wheel case houses the phosphor wheel, the wheel case has an air suction port through which a gas flows in and an exhaust port from which the gas that has cooled the phosphor wheel is discharged, the phosphor wheel unit further comprises a wall portion disposed in a position to be hit by a gas flowing in from the airflow inlet surface and passing through a part of the first heat exchanger, the first heat exchanger includes an airflow outlet surface from which the gas cooled by the first heat exchanger flows out, and the gas flowing into the first heat exchanger from the airflow inlet surface hits the wall portion before flowing out from the airflow outlet surface.

19. A phosphor wheel unit comprising:

a phosphor wheel that converts incident light into fluorescent light and emits the fluorescent light;

a motor that rotationally drives the phosphor wheel;

a first heat exchanger having a plurality of fin members that is arranged and one flat airflow inlet surface through which an airflow generated by rotation of the phosphor wheel partially or entirely flows in; and a regulating member that regulates a direction of the airflow generated by the rotation of the phosphor wheel to one direction, wherein the direction of the airflow, which is the one direction, regulated by the regulating member and a direction perpendicular to a rotation shaft of the phosphor wheel form an angle of between 0 degrees and 45 degrees on a plane perpendicular to an extending direction of a base material of the phosphor wheel, the airflow inlet surface is disposed intercepting the direction of the airflow regulated by the regulating member, and the first heat exchanger cools a gas forming the airflow and the cooled gas returns to the phosphor wheel, the phosphor wheel unit further comprises a wall portion disposed in a position to be hit by a gas flowing in from the airflow inlet surface and passing through a part of the first heat exchanger, the first heat exchanger includes an airflow outlet surface from which the gas cooled by the first heat exchanger flows out, and the gas flowing into the first heat exchanger from the airflow inlet surface hits the wall portion before flowing out from the airflow outlet surface.

20. The phosphor wheel unit according to claim 19, wherein the direction of the airflow regulated by the regulating member is the one direction and the direction perpendicular to the rotation shaft of the phosphor wheel on the plane perpendicular to the extending direction of the base material of the phosphor wheel.

21. The phosphor wheel unit according to claim 19, wherein the direction of the airflow regulated by the regulating member is parallel to one normal direction of the one flat airflow inlet surface.

* * * * *